United States Patent [19]
Allen

[11] Patent Number: 5,909,638
[45] Date of Patent: Jun. 1, 1999

[54] HIGH SPEED VIDEO DISTRIBUTION AND MANUFACTURING SYSTEM

[75] Inventor: Richard D. Allen, Phoenix, Ariz.

[73] Assignee: Maximum Video Systems, Inc., Phoenix, Ariz.

[21] Appl. No.: 08/693,001

[22] Filed: Aug. 6, 1996

[51] Int. Cl.⁶ .................................................. H04N 7/16
[52] U.S. Cl. .................................. 455/6.1; 455/2; 348/3; 348/6; 386/36
[58] Field of Search .................................. 348/7, 12, 13, 348/10, 11, 3; 395/200.47, 200.48, 200.49; 455/4.2, 5.1, 6.1, 6.2, 6.3, 2; 386/46, 36, 122, 22, 23; 705/32; H04N 7/16, 7/173

[56] References Cited

U.S. PATENT DOCUMENTS

| | | | |
|---|---|---|---|
| 3,990,710 | 11/1976 | Hughes | 274/1 R |
| 4,410,917 | 10/1983 | Newdoll et al. | 360/15 |
| 4,528,643 | 7/1985 | Freeny, Jr. | 364/900 |
| 4,593,376 | 6/1986 | Volk | 364/900 |
| 4,597,058 | 6/1986 | Izumi et al. | 364/900 |
| 4,672,554 | 6/1987 | Ogaki | 364/479 |
| 4,674,055 | 6/1987 | Ogaki et al. | 364/479 |
| 4,703,465 | 10/1987 | Parker | 369/30 |
| 4,787,050 | 11/1988 | Suzuki | 364/479 |
| 4,823,196 | 4/1989 | Goddard | 358/310 |
| 4,845,529 | 7/1989 | Pearson et al. | 355/32 |
| 4,872,070 | 10/1989 | Cooper et al. | 360/15 |
| 4,949,257 | 8/1990 | Orbach | 364/401 |
| 5,014,125 | 5/1991 | Pocock et al. | 348/12 |
| 5,041,921 | 8/1991 | Sheffler | 360/13 |
| 5,065,258 | 11/1991 | Warren et al. | 360/15 |
| 5,247,347 | 9/1993 | Litteral et al. | 358/85 |
| 5,260,800 | 11/1993 | Sturm et al. | 358/310 |
| 5,309,437 | 5/1994 | Perlman et al. | 370/85.13 |
| 5,351,146 | 9/1994 | Chan et al. | 359/118 |
| 5,418,713 | 5/1995 | Allen | 364/403 |
| 5,499,148 | 3/1996 | Kubota et al. | 360/73.06 |
| 5,535,186 | 7/1996 | Ishizawa | 369/48 |
| 5,543,932 | 8/1996 | Chang et al. | 358/335 |
| 5,548,451 | 8/1996 | Niki et al. | 360/32 |
| 5,550,863 | 8/1996 | Yurt et al. | 348/7 |
| 5,552,940 | 9/1996 | Umemoto et al. | 360/19.1 |
| 5,555,402 | 9/1996 | Tuma et al. | 395/500 |
| 5,557,541 | 9/1996 | Schulhof et al. | 364/514 R |
| 5,559,779 | 9/1996 | Iizuka | 369/59 |
| 5,610,841 | 3/1997 | Tanaka et al. | 364/514 R |
| 5,661,787 | 8/1997 | Pocock | 379/101.01 |
| 5,699,434 | 12/1997 | Hogan | 380/49 |
| B1 5,065,258 | 11/1994 | Warren et al. | 360/15 |

FOREIGN PATENT DOCUMENTS

| | | |
|---|---|---|
| 0487296 | 5/1992 | European Pat. Off. |
| 0643388 | 3/1995 | European Pat. Off. |
| 0649121 | 4/1995 | European Pat. Off. |
| 2 199 984 | 7/1988 | United Kingdom |

*Primary Examiner*—Chris Grant
*Attorney, Agent, or Firm*—Schwegman, Lundberg, Woessner, and Kluth, P.A.

[57] ABSTRACT

A system for capturing, storing and retrieving movies recorded in a video format and stored in a compressed digital format at a central distribution site is described. A plurality of remote distribution locations are connected through fiber optic connections to the central distribution site. The remote sites maybe of one of two types: a video retail store or a cable television (CATV) head end. In the case of a video retail store, VHS videotapes, other format videotapes or other video media may be manufactured on-demand in as little as three to five minutes for rental or sell-through. A totally automated manufacturing system is described in which the customers can preview and order movies for rental and sale from video kiosks. The selected movie is then either retrieved from local cache storage or downloaded from the central distribution site for manufacturing onto a blank or reused videotape. One feature of the system is the ability to write a two-hour videotape into a Standard Play (SP) format using a high speed recording device. A parallel compression algorithm based on the MPEG-2 format is used to compress a full-length movie into a movie data file of approximately four gigabytes of storage. The movie data file can be downloaded from the central site to the remote manufacturng site and written onto a standard VHS tape using a parallel decompression engine to write the entire movie at high speeds onto a standard VHS tape in approximately three minutes.

35 Claims, 20 Drawing Sheets

HIGH SPEED VIDEO DISTRIBUTION AND MANUFACTURING SYSTEM

FIELD OF THE INVENTION

The present patent application relates to video compression, distribution, and manufacturing and in particular to systems and methods of remote to local video distribution and local video reproduction on-demand.

BACKGROUND OF THE INVENTION

The manufacturing and distribution of movies for viewing in the home is one of the largest industries in the world. The rental and sale of movies on videotape is a constantly growing industry amounting to over $15 billion dollars in software sales in the United States in 1995. The most popular medium for distributing movies to the home is by standard VHS videotape although other formats and mediums are available. One of the reasons for the robust market for movies on videotape is the established base of videocassette recorders (VCR) in peoples homes. This helps fuel an industry of local videotape rental and sale outlets around the country and worldwide.

The VHS videotape format is the most popular videotape format in the world and the longevity of this standard is assured due to the sheer numbers of VHS videocassette players installed worldwide. However, there are other mediums for distributing movies such as laser disk and 8 mm tape. In the near future, Digital Versatile Disk (DVD) technology will probably replace some of the currently used mediums since a higher quality of video and audio would be available through digital encoding on such a disk. Yet another medium for distributing movies to the home is through cable television networks currently providing pay-per-view capabilities and in the near future, direct video on-demand.

For the consumer, the experience of renting or buying a videotape is often frustrating due to the unavailability of the desired titles. Movie rental and sales statistics show that close to 50% of all consumers visiting a video outlet store do not find the title that they desire and either end up renting or buying an alternate title or not purchasing anything at all. This is due to the limited space for stocking many movie titles within the physical confines of the store. With limited inventory, video stores can only supply the most popular titles or a small number of select titles. Increasing the inventory of movie titles is in direct proportion to the shelf capacity of any one video store.

Direct video distribution to the home is also limited by the availability of select and limited titles at predefined times. Pay-per-view services typically play a limited fare of titles at predefined times offering the consumer a very short list of options for movie viewing in the home. Video on-demand to the home is limited by the cable television head end facilities in its capacity to store a limited number of titles locally.

All of the aforementioned mechanisms for distributing movies to the consumer suffer from inventory limitations. An untapped demand in movie distribution results if the inventory to the consumer can be made large enough and efficient enough to produce movies on-demand in whatever format the consumer desires. There is a need in the art, therefore, for the ability to deliver movies on-demand with a virtually unlimited library of movies on any number of mediums such as VHS videotape, 8 mm videotape, recordable laser disk or DVD technology.

Some systems have addressed the need for distribution of digital information for local manufacturing, sale and distribution. For example, U.S. Pat. No. 5,418,713 to Allen described a system for on-demand data delivery and reproduction of program material at a remote site. This system describes a central site which stores digitized information such as digital video game information which can be downloaded to a manufacturing site for storage onto, for example, a blank video game cartridge. The manufactured game cartridge can be ordered on-demand from a large variety of titles and delivered to the consumer within a matter of minutes. The shortcomings of the system described in U.S. Pat. No. 5,418,713 is the inability to download and manufacture or distribute large volumes of digital information such as would be required for the downloading, distribution or manufacturing of fall motion, full length video movies.

Another method of delivering information is U.S. Pat. No. 4,528,643 to Freeny Jr. This system provides information to a remote manufacturing machine located on a point of sale location. This system is mainly directed to reproducing pre-recorded music titles on eight-track tapes. The system also suffers from the inability to distribute large volume of digital data necessary for full motion full length movies on videotape and the like and lacks the ability to produce a videotape at high speeds.

A limited number of systems are also known in the art for writing videotaped information at speeds greater than the normal playback speeds. For example, U.S. Pat. No. 4,872,070 to Cooper et al. describes a system and method for high speed videotape reproduction. The source of the video information for reproduction is from a laser disc player which is specially equipped with two optical read heads. The optical disc player also rotates the disc at twice the standard speed allowing information to be read from the optical disc at four times its standard playback rate. In a similar fashion, the helical scan videotape recorder unit has two write head pairs for writing the video information on the videotape and parallel while the tape is moved at twice its normal speed thus producing a 4× write capability. This system lacks the ability to write videotapes at higher than four times their normal viewing speed and requires that the video information come from a video disc player. Although two parallel video signal paths are described, the system lacks the ability to decompress video images from a compressed video file format.

Another system known in the art for writing videotape at a speed faster than the normal viewing speed is found in U.S. Pat. No. 5,065,258 to Warren et al. This system is an analog to analog system in which an analog videotape is played at a higher than normal speed and the signals therefrom are recorded by a second video recorder at the same higher than normal viewing speed. This system lacks the ability to write videotapes at more than twice the normal viewing speed and lacks the ability to process parallel streams of video data from a compressed file format.

Another type of video duplication device is shown in U.S. Pat. No. 5,260,800 to Sturm et al. This system duplicates video cassette tapes at twice the normal viewing speed. The source video information comes from modified video disc players which operate at twice the normal NTSC video format speed. The video and audio information is converted to analog signals which are written at twice the normal viewing speed by a modified VHS video cassette recorder. This system lacks the ability to duplicate a videotape at anything more than twice the normal viewing speed and operates only in the analog domain. This system lacks the ability to write video cassette tapes using parallel data streams of compressed data from a digitally encoded file.

There is a need in the art, therefore, for a method and system of distributing large volumes of digital information representing full length, full motion movies in a video format to remote locations for on-demand purchase or rental. This need in the art is directed both to on-demand video distribution through cable television headends or through the availability and manufacturing of movie titles on videotape or other medium at video rental retail outlets. There is also a need in the art to track the distribution of a large number of movie titles for accounting and copyright compliance. There is a further need in the art for the automated inventory tracking and billing for the distribution of a large volume of titles for movies. There is a further need in the art for manufacturing video tapes at many times the normal viewing speed from digitally compressed and stored data files.

SUMMARY OF THE INVENTION

The present invention solves the above-mentioned problems in the art and other problems which will be understood by those skilled in the art upon reading and understanding the present specification. The present invention provides a system for capturing, storing and retrieving movies recorded in a video format and stored in a compressed digital format at a central distribution site. A plurality of remote distribution locations are connected through fiber optic connections to the central distribution site. The remote sites, in the preferred embodiment, may be of one of two types: a video retail store or a cable television (CATV) head end.

In the case of a CATV head end, cable subscribers can request a movie title which is downloaded to the CATV head end. The CATV head end then decompresses the movie, converts it into an analog format and transmits the movie over a dedicated channel to the requester.

In the case of a video retail store, videotapes or other media may be manufactured with the movie on-demand in as little as three to five minutes for rental or sell-through. A totally automated manufacturing system is implemented in which the customers can preview and order movies for rental and sale from video kiosks. The selected movie is then either retrieved from local cache storage or downloaded from the central distribution site for manufacturing onto a blank or reused videotape. One feature of the present invention is the ability to encode a two-hour videotape in Standard Play (SP) mode using a compressed MPEG-2 format to store an entire movie into approximately four gigabytes of storage. The movie data file can be downloaded from the central site to the remote manufacturing site and written onto a standard VHS tape using a parallel decompression engine to write the entire movie at high speeds onto a standard VHS tape in approximately three minutes. All accounting and tracking of rentals and sales or viewing of movies on-demand are tracked at the central site through accounting and transaction computers. Electronic banking is also an available option to track the payment of royalties and copyright fees to the movie owners.

Another aspect of the invention is a high speed video writer. Digital video information in the MPEG-2 or equivalent format is decompressed and decoded in a parallel process and converted to analog video signals to drive multiple write heads of a helical scan video write drum to simultaneously write multiple frames or fields of video during one rotation of the drum. The analog video signals are written on the video tape in parallel at the azimuth required for regular speed playback. To achieve an even higher tape writing speed, the tape is moved past the drum at multiples of the normal speed and the carrier frequencies of the video information are shifted up in the frequency band such that regular speed playback of the tape retrieves the video carrier frequencies in the standard frequency locations.

Another aspect of the invention is a parallel decompression algorithm and engine which separates the MPEG-2 video into parallel streams of digitized video information. The parallelism can be across a single frame or field of video or it could be across separate frames or fields of video. The decompression engine is used to drive high speed video writers and can be used to drive a plurality of high speed writers in a mass duplication factory environment.

BRIEF DESCRIPTION OF THE DRAWINGS

In the drawings, where like numerals refer to like components throughout the several views.

DETAILED DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

System Overview

Figure 1:
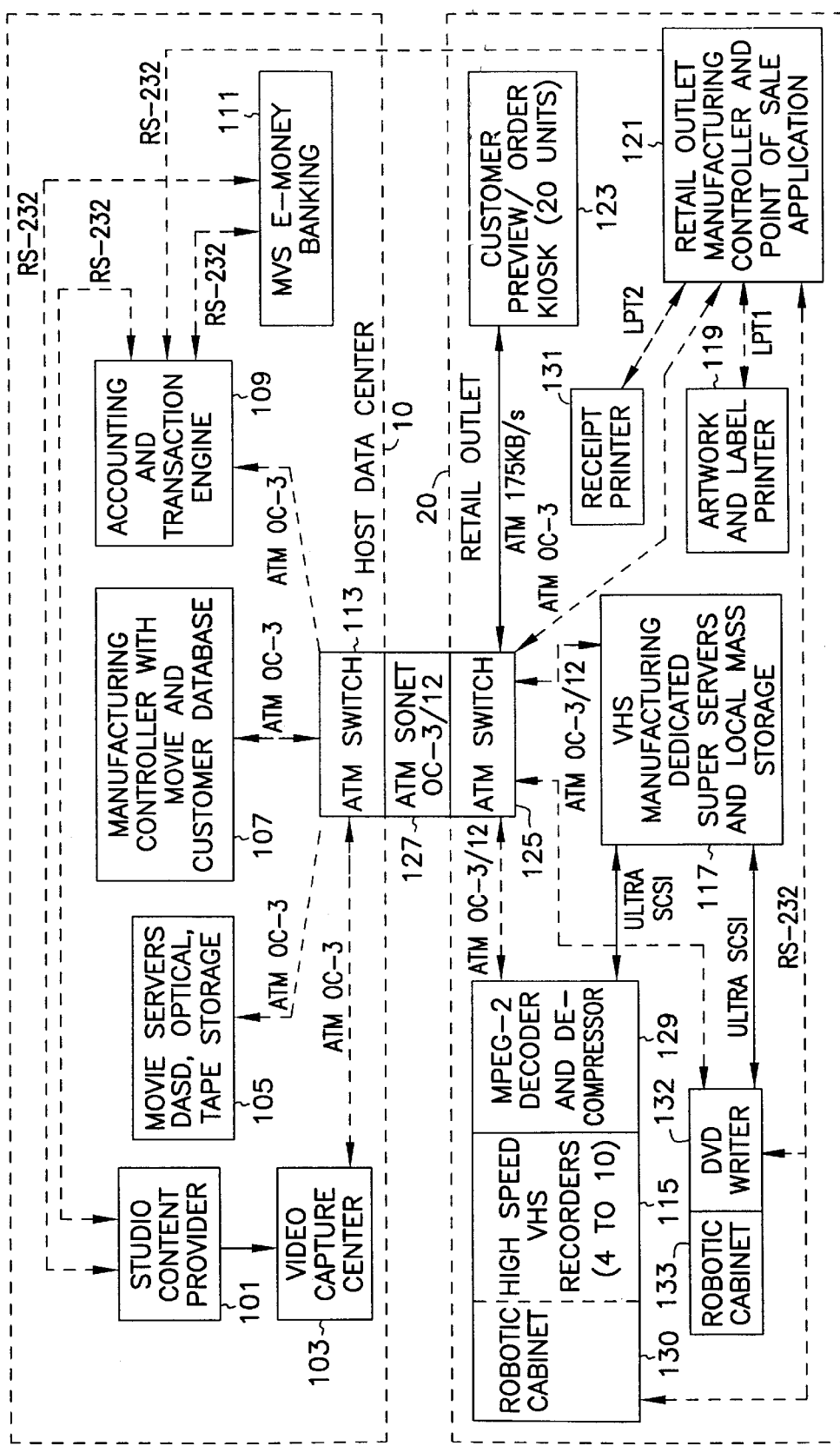
FIG. 1 is a diagram of a video distribution and manufacturing system.

A video distribution and manufacturing system is shown in the block diagram of FIG. 1. The top half of FIG. 1 describes a host data center 10 which would be located at a central location and serving a wide aea of remote manufacturing locations across a wide geographic area. The bottom half of FIG. 1 describes one of a plurality of remote manufacturing centers 20 which would be located at a plurality of locations. The remote manufacturing center 10 in the preferred embodiment is connected with a plurality of remote manufacturing centers through a fiber optic network connection in the preferred embodiment. As will be described more fully below, alternate means of communicating between the host data center and the plurality of remote manufacturing centers may be through satellite communication, land-wire connection and other types of communication mediums.

The present invention in the preferred embodiment is designed to distribute and manufacture on-demand full-length video movies at the plurality of remote manufacturing sites for a user while he or she waits for the tape to be manufactured. The advantage of the present invention is that the remote manufacturing outlets in the form of retail video stores virtually never run out of stock for a particular movie title whether it be for a rental or sell-through. The movie is manufactured while the customer waits using high-speed video recording devices. The movie content is either stored locally at the remote manufacturing site in a compressed digital format such as MPEG-2, or the movie is downloaded from the host data center via the communications medium. The typical time for writing a two-hour VHS movie for playback at SP (standard play) speed is typically 3 minutes. Downloading the movie from the host data center may add an increment of one or two minutes to the overall manufacturing time. Those skilled in the art will readily recognize that the present system is adaptable to writing the movie information in a variety of formats such as digital video disk (DVD), 8 millimeter videotape, etc.

The remote manufacturing site may also have the capability of producing artwork for the packaging of the movie which is either being sold or rented. The artwork, like the movie video data itself, is in a digitized form associated with the movie and either stored locally at the remote manufacturing site or downloaded from the host data center. The artwork may be generated along with tape labels and the like by a local artwork printer device.

Associated with the present invention is a transaction and accounting system which monitors the distribution and manufacturing of all video movies at all the remote sites for proper accounting to the copyright holders and distribution agents for each transaction.

Video Distribution Block Diagram

FIG. 1 is a block diagram of the preferred embodiment of the present invention. The process begins with the studio content provider in which the movie may be provided in a film form or in an analog video format or in an already digitized version. Whatever the original format, the movie must be placed in a compressed digital format through the video capture center 103. The video capture center 103 is required to put the digitized image of the movie into a modified MPEG-2 format in the preferred embodiment of the present invention. The digital encoding process use an eight-wide parallel encoder to facilitate the high speed manufacture of the movie, as described more fully below. A portion of the video capture center 103 is a quality assurance step to make sure that the video transfer was done properly and the quality of the transfer is good. The captured video data of the movie from the video capture center 103 is transferred to a storage system 105. In the preferred embodiment of the present invention, the data transfer from the video capture center to the storage system is done locally at the host data center using a local asynchronous transfer mode packet protocol over fiber optic links through an asynchronous transfer mode (ATM) switch 113. The movie in its digitized, parallelized and compressed format is stored at the movie servers 105 on high-speed rotating mass storage (fixed disk drives), optical storage or archived in tape storage. A typical two-hour movie is compressed into a file approximately 4 gigabytes in size.

The host data center operation is controlled by a number of computers which are interconnected in a symmetric multiprocessing configuration. One of the primary functions of the host data center is the distribution of the digital video files containing the movie images. This is an I/O-bound application requiring high data bandwidth to transfer the movies but very little processing. Another function of the host data center is the accounting and transaction information and the movie database cataloging. The overall design of the host data center, as described more fully below, is modular and expandable so that the host data center can expand to service a larger and growing number of video retail outlets also known as the remote manufacturing centers. The symmetric multiprocessing environment is configured as a bus architecture using multiple P5 processors or the like. Multiple processors are configured to operate in parallel which allows the expendability of the system by adding additional processors and, therefore, additional processing capacity to handle more movie transactions and movie distributions.

Also included at the host data center is the transaction engine 109 which communicates with the plurality of remote manufacturing sites to monitor the number of sales and rentals of various movies distributed through the remote manufacturing outlets. The accounting and transaction engine 109 can communicate with the other components of the host data center to keep a current accounting of all transactions. In addition, the accounting and transaction engine 109 can communicate with electronic money banking system to credit and debit accounts on a daily basis, if necessary, or less often if desired.

Communication Medium

The ATM switch 113 allows the high-speed transfer of movies and other account and transaction information from the host data center to the plurality of remote manufacturing sites through fiber optic cabling networks. In the preferred embodiment of the present invention, an ATM sonet OC-12 fiber optic network would be desirable to transfer the movie files at the highest possible transfer rates. As described above, each two-hour movie typically is stored in approximately 4 gigabytes of memory. To transfer a 4 gigabyte file over an ATM sonet OC-12 network would take approximately 3 minutes.

Figure 2:
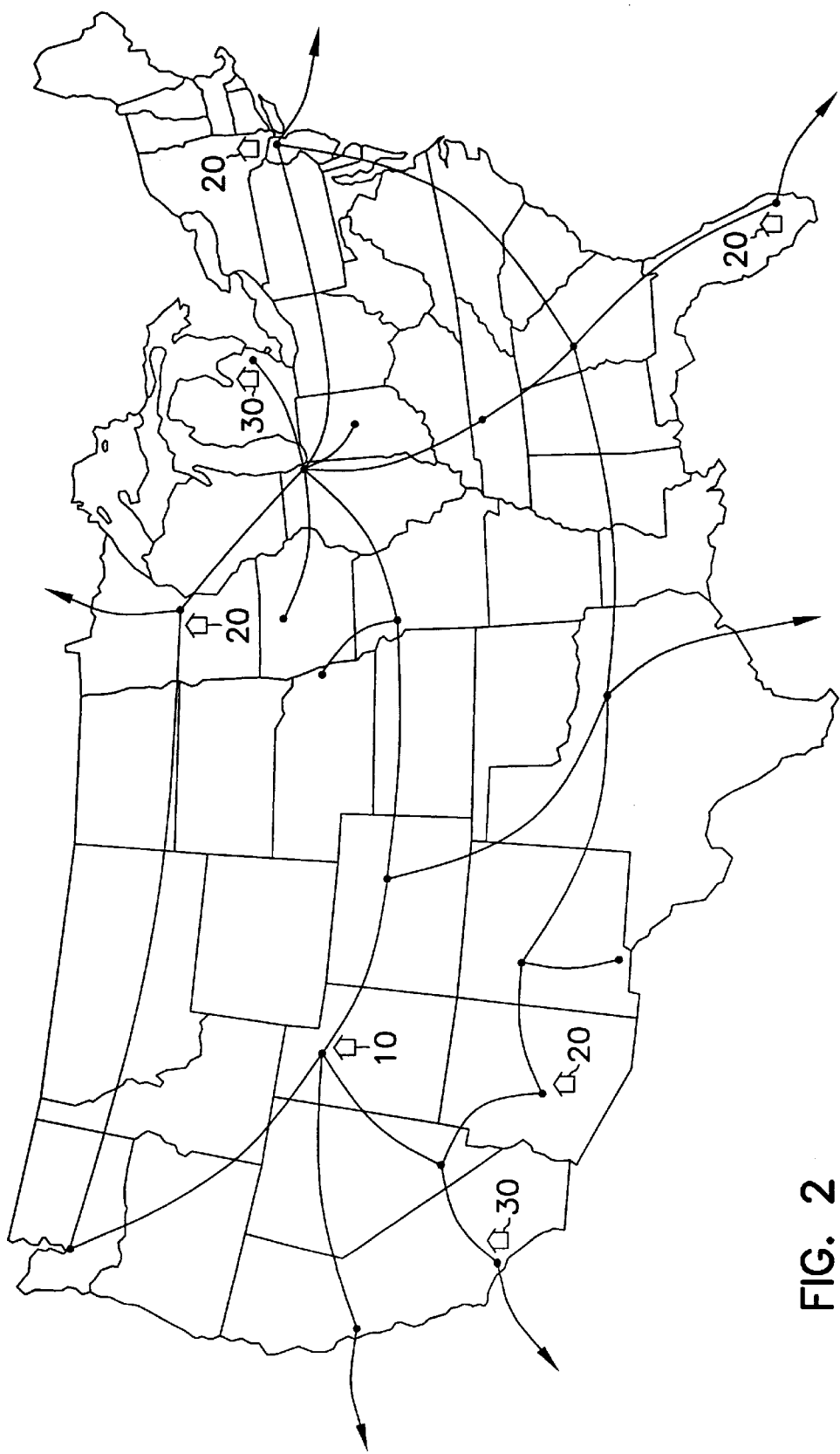
FIG. 2 is a map of the United States showing some of the currently installed OC-12 fiber optic connections which may be used for the distribution of large data files such as digitally encoded movies.

FIG. 2 is a representative drawing of the United States showing some of the currently existing OC-12 fiber optic connections around the country. This map is representative only and not an exhaustive example of all available connections. By placing a host data center 10 at, for example, Salt Lake City, Utah, the entire nation could be serviced through the fiber optic channels connecting most major cities in the United States. There is enough connectivity through Salt Lake City to allow for backup links should any of the other major links become severed thereby ensuring uninterrupted service from the host data center to the remote manufacturing sites. As shown in FIG. 2, a plurality of remote manufacturing sites may be located at Phoenix, Minneapolis, Miami and New York, by way of example but not by limitation. Also, cable television headends 30 located at Los Angeles and Detroit receive movies in a compressed format from the central data center 10 for on-demand viewing by local CATV subscribers.

Overview of the Remote Manufacturing Sites

Referring once again to FIG. 1, the remote manufacturing site is also described. The compressed digital representations of the movies are either stored locally in the dedicated superservers in local mass storage system 117 of the remote manufacturing site or they are downloaded from the host data center for storage on the local mass storage of the dedicated superservers 117. The dedicated server 117 includes a local storage cache of movies designed to locally hold the top 100 movies such that 90% of all the movies manufactured at the remote manufacturing site will come out of the local storage cache within the server 117. In this fashion the fiber optic communication network is not needed for every manufacturing task. In order to keep the cache at its optimum operating level, statistics are kept locally on the most frequently requested movies, and new releases such that the cache is utilized at the highest rate and the communications medium is utilized only in the least amount of time.

Each remote manufacturing site keeps statistics based on local tastes of what the most frequently requested movies are in terms of statistical demand. The dedicated server 117 keeps information about current and future releases so that information is available to customers as to time and dates of availability. These are also kept in the statistical database to service the client.

The primary customer interface is the customer preview and order kiosks 123. These are connected to the dedicated superserver 117 to obtain customer information and order data and to allow customers to preview excerpts from movies contained in the repertoire of the entire system. The server 117 contains preview information in the cache and should the requested preview not be available locally, the server 117 requests the downloading of the preview through the ATM connection 113 from the central site 10. In this fashion all preview information about the entire movie database of the system is available on a near instantaneous basis to customers operating the kiosks 123. The kiosks 123 gather information regarding customer requests, preview and general customer interest in different types of products, which are described more fully below.

The retail outlet manufacturing controller and point of sale computer 124 is also connected to the dedicated server 117 with its associated cache. The customer can order a specific movie through the kiosk 123 and the retail computer 121 orders the manufacture of the movie and processes the transaction. The retail outlet controller 121 requests that the server 117 produce the movie on, for example, a VHS tape and the availability is checked against the local cache within server 117. If the movie is not locally available, the server 117 will request the downloading of the movie from the manufacturing controller 107. Whether the movie is available locally in the cache or whether the movie must be downloaded, the movie is transferred to the high speed video recorder 115 for the manufacture of the movie.

The movie is produced by a high speed recording device 115 which in the preferred embodiment of the present invention is a 40× high-speed VHS recorder which can write (record) a movie at forty-times its normal viewing speed. This is roughly equivalent to recording a two-hour VHS tape at SP (Standard Play) speed in approximately three minutes. In this fashion, the selected videotape movie is manufactured at the site from a blank videotape or a recycled videotape. The high speed recorder simultaneously writes 8 fields of video information to the videotape using a multiple-write-head helical scan drum which rotates at 5 times the normal rotation speed. By moving the tape at 40 times its normal speed, the resulting write rate is 40 times normal. In addition, the helical scan write head also includes multiple hi-fi audio record heads operating to record 8 frames of hi-fi audio information on top of the video information on the tape. Finally, linear stereo record heads and control track record heads operate at 40 times the normal frequency to record the linear stereo and control information on the VHS videotape.

In the preferred embodiment of the present invention the high-speed VHS recording unit 115 is placed within, or connected to, at least one robotic cabinet 130 for robotic storage and retrieval of VHS cassette tapes. The tapes are retrieved from this storage cabinet 130 and loaded under robotic control into the high-speed VHS recorder within unit 115. Also included in the high-speed VHS recorder unit is the ability to recode and refurbish tapes which are returned after rental by the consumer. This return, recode and refurbish (3R) capability is used to ensure the high quality of the videotape movie product by tracking the use of the videotape by means of specially encoded information placed on the tape. In the preferred embodiment of the present invention such information encoded on the videotape would be, by way of example and not by limitation, the number of times the tape has been recorded, the number of rentals on this tape, the last user to check out this videotape and other processing and tracking information. This information is written in the linear audio or control track either as a header or trailer of the videotape, before or after the movie. This information could also be written in the vertical blanking interval though the video record heads. A more detailed description of this information is described below.

Detailed Description of the Host Data Center

The Host Data Center 10 is, in the preferred embodiment, located in a central location to service a large geographic region. To service the United States, Salt Lake City, Utah has been chosen due to its excellent connectivity to the nation's fiber optic networks and other factors. Those skilled in the art will readily recognize that the components of the host data center 10 do not necessarily need to be located in the same geographic location. The video capture facility maybe located at the Host Data Center 10 site or it may be located at any other convenient location. For example, the video capture facility could be located closer to major movie studios in Hollywood, Calif.

Video Capture Facility

The video capture facility 103 receives the movies from the studio content provider 101. This maybe any number of content providers such as Universal Studios, MGM, Time Warner, etc. The studio content maybe provided in any number of formats including 16mm film, or any number of electronic video formats. The video capture facility receives the content in its source format and transfers it to the specific compressed and encoded MPEG-2 format used by the present invention.

Also captured by the video capture center are materials associated with each movie such as movie previews, movie labels, movie sell-through artwork in digital, analog and photographic forms. All this additional material is also transferred to a digital format and stored in files associated with the movie. The artwork can be transferred from the central site 10 to the remote manufacturing site 20 for use in reproducing the artwork for the jackets or covers on the videotape shells and cases. The preview information is used by the customer preview and order kiosks 123. The digitized versions of the movies, and the associated artwork and previews, are all identified and tracked through a relational database in the manufacturing controller 107 as described more fully below.

The digital video and audio information for a movie is encoded and compressed in an MPEG-2 format using a compression engine which is the exact analog of the decompression engine described below. In operation, the compression engine receives the chrominance, luminance and audio information of the digitized video signal representing the full motion movie and encodes each frame in a parallel process. In the preferred embodiment, eight frames of video information are processed in parallel and compressed into a compressed MPEG-2 format corresponding to one rotation of the helical scan write head of the high speed video recorder. Then, the next eight frames are compressed such that the data description of the overall movie represents eight frame segments or groups of pictures (GOP). Those skilled in the art will readily recognize that the parallel process of the compression engine could compress segments of a single frame of the picture rather than compressing whole frames in parallel. This latter approach is called parallel over space compression in which each video frame would be segmented into eight segments and each of the eight segments would be compressed in parallel and stored in MPEG-2 format.

Once encoded, the entire fall motion video with audio is stored in a data file occupying approximately four gigabytes of space. This file is then stored and cataloged, along with any associated files containing artwork, movie trailers, previews and the like, into the movie server storage system 103. All files are tracked with a relational database maintained by the manufacturing controller 107. The files are also encrypted to ensure security against theft. They may be encrypted as stored or may be encrypted before transfer to the retail outlet 20.

Manufacturing Server and Movie Storage

A manufacturing controller and movie database 107 in conjunction with the movie storage facility 105 are the central components of the ability to provide movie video on-demand. This system overcomes the inventory storage problem of current video outlets and video on-demand CATV head ends by utilizing the central repository in the movie storage facility 105 to store and dispense digital copies of movies in an electronic form rather than then the current "hard copy" distribution system. The central repository and storage facility 105 enables the distribution of a very large number of popular movies and hard to find titles currently unavailable to most video outlets and cable television distributors of video on-demand. This results in no product shortage (which can produce customer dissatisfaction) and no product surplus (which can produce profit erosion for the retailer) at the retail level. The movie storage facility 105 will also store movie previews, sell-through artwork, label data and database header information in a digital format for downloading with the movie to the retail level for generation of artwork when the movie is manufactured or for previews when the customer accesses the movie preview kiosks 123.

Movies are transferred to the retail facility from the movie storage facility 105 using asynchronous transfer mode (ATM) protocol on an optical fiber network. The movie files are transferred through an ATM OC-3 fiber to an ATM switch 113 locally which then transfers the files to the retail outlet over an ATM synchronous optical network (SONET) OC-12 fiber optic connection 127. The manufacturing controller 107 is also connected to the retail outlet through the ATM switch 113 using an ATM OC-3 fiber optic connection, and through the ATM synchronous optical network (SONET) OC-3 or OC-12 fiber optic connection 127.

Accounting and Transaction Engine

The accounting and transaction engine 109 of FIG. 1 is also connected to the retail outlet and to the other components of the host status center 10 through an ATM OC-3 fiber through ATM switch 113. All accounting and transaction information is recorded by the accounting and transaction engine 109 which also has external connections to allow electronic money banking. The accounting and transaction engine 109 accounts for each transaction at the retail level including revenue accounting, customer demographic information database, support inventories and the retail outlet financial accounting. The system also collects and maintains identification and demographic data for each customer which would include, by way of example and not by limitation, the name, address, home telephone number, preferred contact procedure, major credit card number and historical use profile information. This information would also include product type, use, frequency, date and time information and payment schedules. A voice identification database is also an option in which a customer could identify them self at the kiosk 123 by voice identification with the voice print information stored in the accounting engine 109. An advantage of storing all customer data at the central site 10 in the accounting and transaction engine 109 is to provide the freedom for customers to visit any franchised retail outlet 20 across the entire geographic region serviced by the host data center 10. The customer would only need to register once and thereafter can visit any retail outlet 20 to rent of buy movies.

Upon authorizing a transaction, the accounting and transaction engine 109 issues a unique transaction order number and controls the initiation of the requested transfer of the movie as well as payment of studio royalties and the updating of an accounts payable database. The transaction engine 109 also updates all accounting records and bills the retail outlet for the transaction. By downloading information to the retail outlet, the accounting and transaction engine 109 can update the customer database which may also be held locally in the retail outlet manufacturing controller 121.

The accounting and transaction engine 109 also is capable of electronic funds transfer. Financial transactions between the retail outlets and the host data center and with the external movie studios utilizes direct electronic funds transfer 111 between the several accounts. The accounting and transaction engine performs account balancing on a daily basis including foreign currency conversion. Electronic funds transfer 111 is based on a fixed and pre-negotiated set of billing rates. The retail outlet may elect to offer the several products at higher or lower prices but may not change the fixed system billing rates.

The accounting and transaction engine 109 also monitors all accounts and can provide account summary and reports. With this facility, studios can monitor their individual financial data, sales results and promotion results from the retail level on a real time basis. In addition, the retail outlets shall be able to monitor their own financials on a real time basis. To facilitate the electronic banking, customer payments shall be either by means of major credit card or by cash transactions handled at the retail level.

The accounting and transaction engine 109 also monitors and facilitates sell-through product return and rental transaction closure. Upon a product return or rental transaction closure (rental return), the system updates the customer financial and demographic databases including all final or late charges. The inventory accounting databases are updated and the transaction is closed.

The system also employs computer and physical security features to protect the interest of the customers, the studios, the retail outlets and the host data center company. Transaction authorization codes, data encryption and movie specific passwords are included to provide additional security. The system ensures that all customer information and demographic data is kept confidential unless the use thereof is specifically authorized by the customer.

Detailed Description of the Retail Manufacturing Center

The plurality of retail manufacturing centers 20 are, in the preferred embodiment, located in local communicates across a large geographic area such as the entire United States. The retail manufacturing centers 20 are connected to the host data center 10 through fiber optic links as described above. Those skilled in the art will readily recognize that alternate communication links are possible including satellite links and high speed wire connections.

The Decompression Engine

Figure 3:
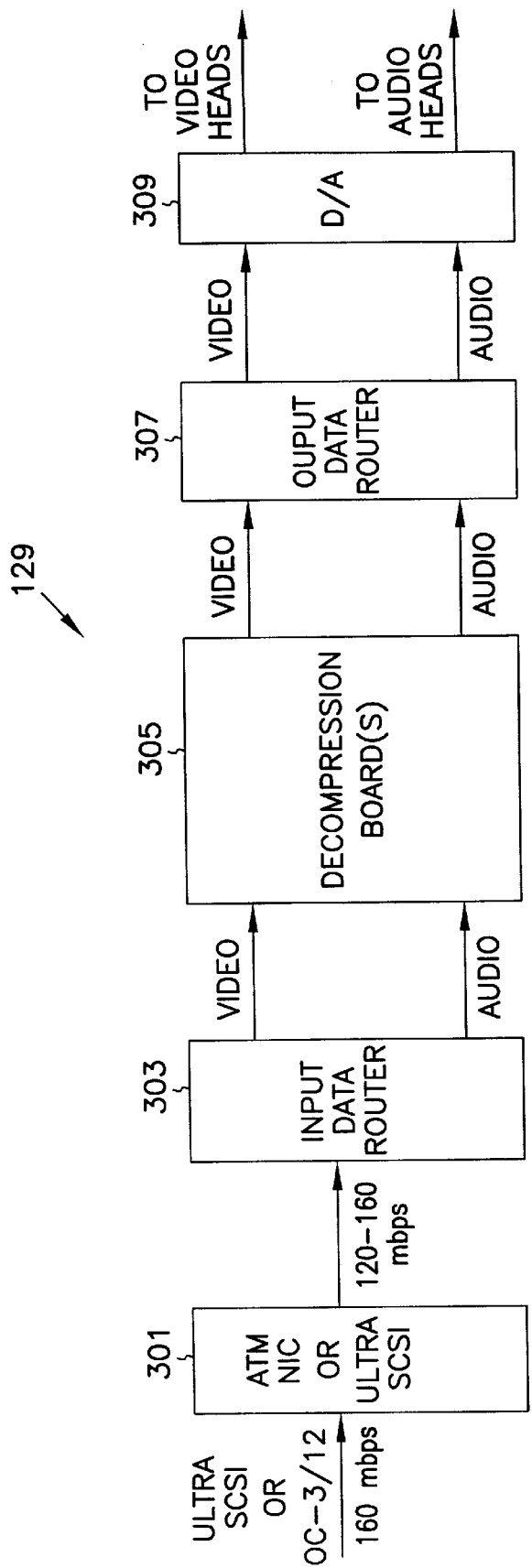
FIG. 3 is a block diagram of the decompression engine.

As described above, the digitized movies are kept in an MPEG-2 compressed format in such a way as to facilitate parallel decompression at the manufacturing site. FIG. 3 is a block diagram of the decompression engine 129 and those skilled in the art will readily recognize that the compression engine used in the video capture center 103 is an analog of this decompression architecture. Referring to FIG. 3, the movie data file in its compressed, encoded and encrypted form is received from the ATM switch 125 over, in the preferred embodiment, a local ATM OC-3 or OC-12 fiber optic connection. The MPEG-2 decoder 129 receives the movie through an ATM network interface card (NIC) 301 as shown in FIG. 3. This OC-3 fiber optic connection is typically operating at 155 megabits per second (mbps). The ATM NIC card 301 buffers and transfers this data to the input data router 303 where the format of the MPEG-2 data is broken into its corresponding video and audio components. The decompression board 305 receives the separate video and audio components and decompresses the information into a plurality of parallel video data streams and a plurality of audio data streams depending upon the type of audio format encoded such as stereo, surround sound and multi-channel audio. The output data router 307 directs the data streams of both video and audio components to the digital-to-analog converter 309 of the respective high-speed 40× VHS recorder where the individual data streams are converted from digital to analog signals for recording by the video and audio heads, respectively. The decompression engine 129 may service one or several high speed recording devices. In the case of a video duplication center, a single decompression engine 129 may simultaneously send the reconstructed movie information to a plurality of high speed video recorders for mass duplication of movies at 40× speed.

Figure 4:
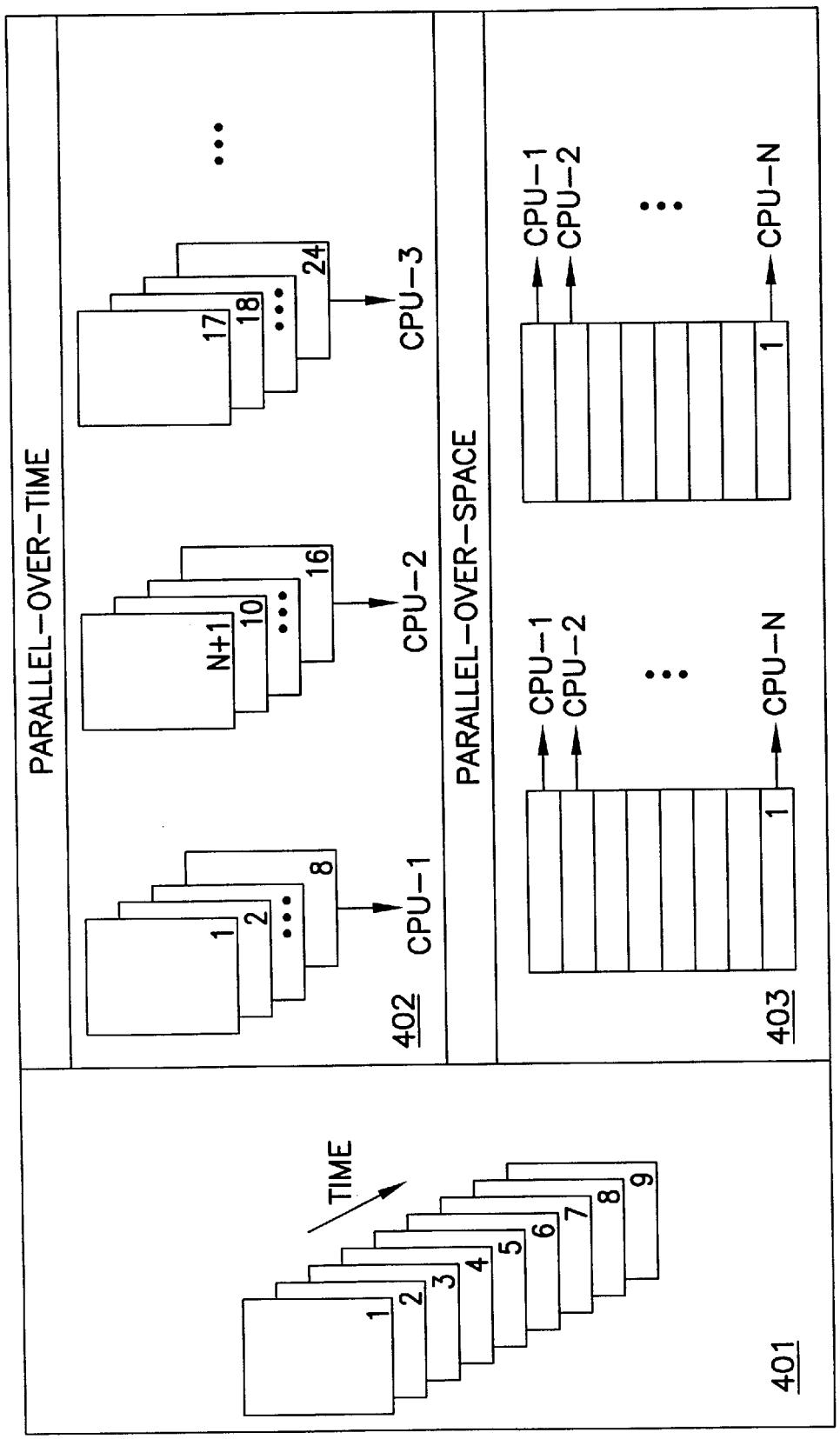
FIG. 4 is a diagram indicating the two parallel formats in which the decompression engine may operate.

As described above, the decompression engine 305 may operate in one of two general architectures as shown in FIG. 4. Since the 40× high-speed VHS recorders require parallel data streams to write eight tracks of video information simultaneously using a helical scan drum rotating 5 times the normal SP speed onto a videotape moving at 40 times the normal SP speed, the information must be received by the VHS recorder in a parallel format at a high speed. The parallel format used may be parallelized over time or over space as shown in FIG. 4. The pictures or video frames depicted in 401 of FIG. 4 show video frames numbered 1–9 which represent a plurality of video frames making up a moving picture. Those skilled in the art will readily recognize that the video frames may be of a variety of video formats such as NTSC, PAL, SECAM, and any variety of other variations on video formats. In essence, each of the video frames is sequential in nature in the movie format and likewise will be sequential in nature when recorded on a videotape.

In the preferred embodiment of the present invention, the decompression engine and its compression analog, compress and decompress the video frames in a parallel over time format 402. In this fashion, eight video frames are processed in parallel by each central processing unit of the decompression engine. As shown in block 402 of FIG. 4, video frames 1–8 are parallel processed through CPU-1, video frames 9–16 are processed through CPU-2 and video frames 17–24 are processed through CPU-3, etc. In this fashion, when the video information is decompressed from the MPEG-2 format, eight frames of video are processed in parallel for parallel writing by the eight heads (16-gap pairs) helical scan recording head of the high-speed video recording devices described below.

In an alternate embodiment, the video information could be parallel processed over space as shown in block 403 of FIG. 4. In this fashion, each video frame is divided into N segments, which in the preferred embodiment would be eight segments. Each of the eight segments would be parallel processed by one of eight CPUs. Each successive frame of video information would likewise be segmented into eight portions for parallel processing. In the preferred embodiment to the present invention, however, the parallel over time concept is preferred.

Figure 5:
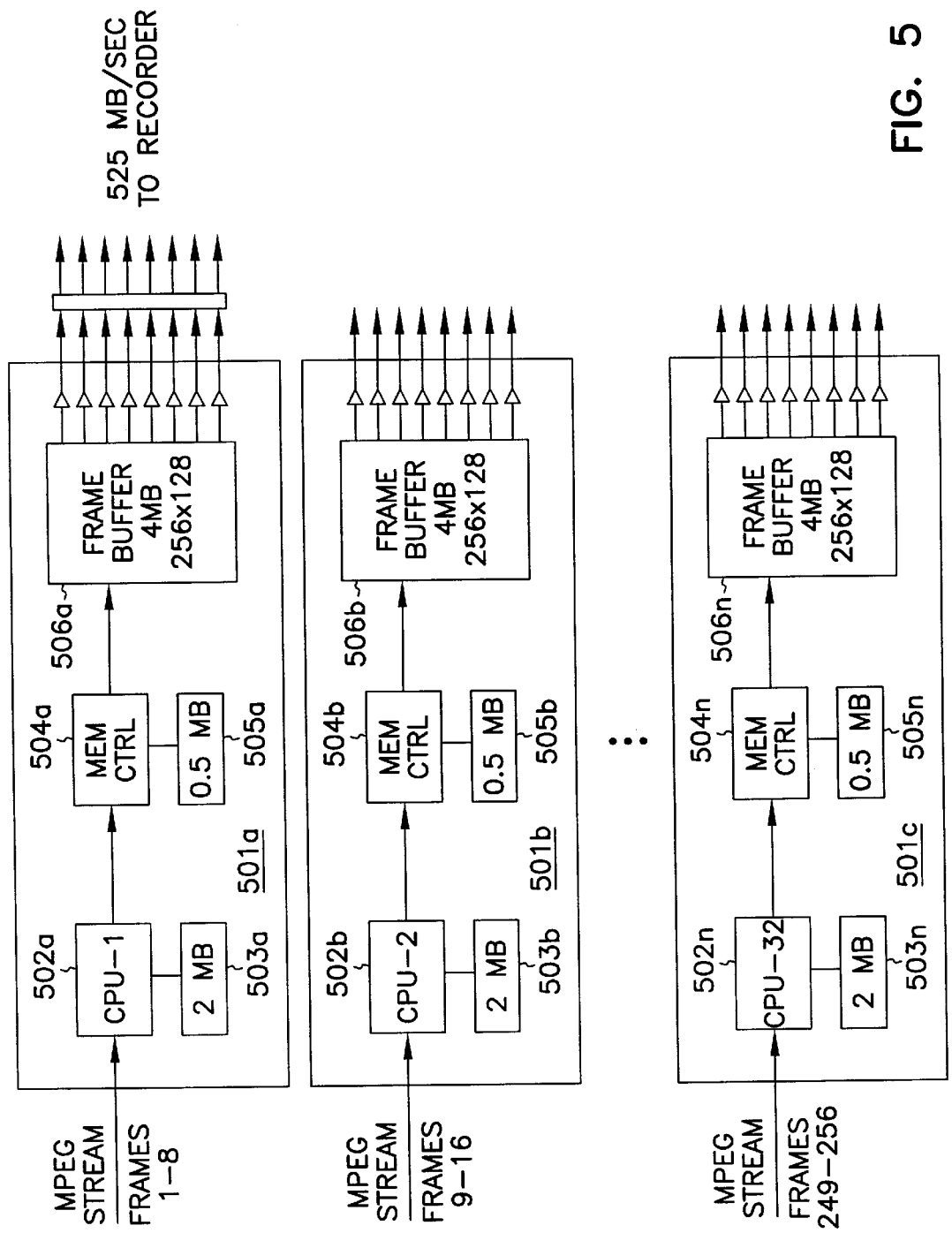
FIG. 5 is a block diagram showing the general architectural design of the parallel processing of the decompression engine.

The general architectural design of the parallel processing of the decompression engine is shown in FIG. 5. The MPEG-2 data stream received from the input data router 303 of FIG. 3 is fed to parallel processing pipelines 501a, 501b–501n, generally referred to as parallel pipeline processor 501 and generally representing the decompression boards 305 of FIG. 3. In parallel pipeline processor 501a, the MPEG-2 data stream receives frames 1–8 of the original video signal by CPU-1. CPU-1 of parallel pipeline processor 501a has a local store of approximately two megabytes of storage. Each of the parallel processors 501 have identical architecture but process different sets of video frames. For example, parallel pipeline processor 501b receives frames 9–16 of the NPEG data stream. Thus, when parallel pipeline processor 501a is processing frames 1–8 in a parallel fashion of the video information, pipeline processor 501b is also processing frames 9–6 to ensure that the data is available when needed for writing by the high-speed VHS recorder.

The decompressed parallel data streams for frames 1–8 of the MPEG-2 data stream as processed by CPU-I of parallel pipeline processor 501a is fed to a memory controller 504a which contains a local store of 500 kilobytes of memory 505a. The memory controller controls the loading of frame buffer 506a with the decompressed video information for the eight frames of video data. Frame buffer 506a is capable of unloading eight frames of video information in eight parallel data streams operating at 552 megabytes per second for driving the high-speed VHS recorder through digital-to-analog (D/A) converter 309. The other parallel operating pipeline processors 501 of FIG. 5 operate in a similar fashion such that when the video heads are ready for the next set of frames of data, that processor has already loaded its respective frame buffer 506 for unloading the data information to the high-speed recorder.

Figure 6:
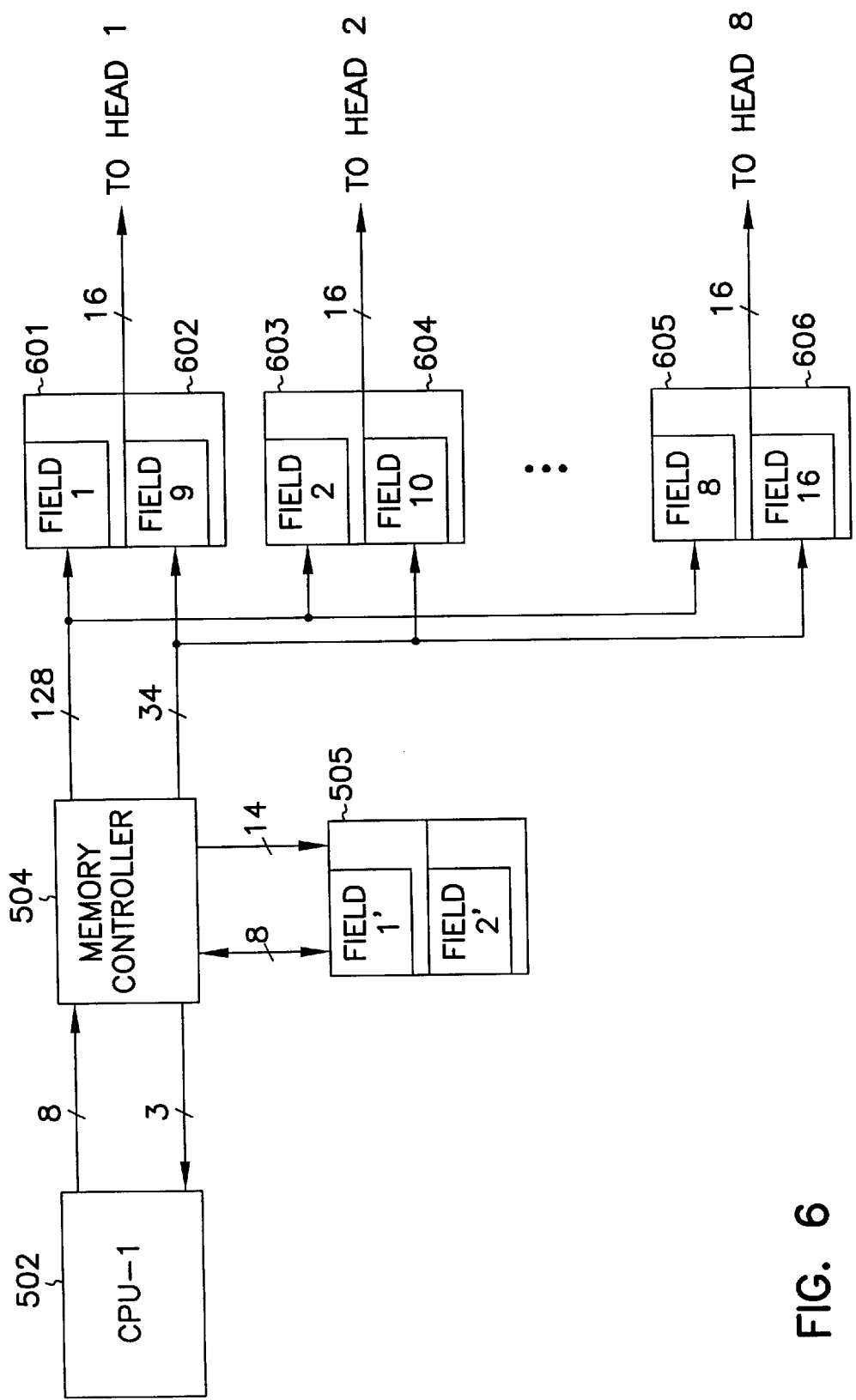
FIG. 6 is a more detailed description of the parallel operation of an individual parallel processing pipeline of FIG. 5.

FIG. 6 is a more detailed description of the parallel operation of the memory architecture of an individual parallel processing pipeline 501 of FIG. 5. CPU 502 performs the data decoding and formatting of the compressed MPEG-2 data stream into an eight bit wide byte for each pixel of the video frame to be written. Those skilled in the art will readily recognize that each frame or picture of a video image is actually comprised of two fields of information. The fields are interlaced in the NTSC and PAL formats but are processed separately. Each pixel byte is decoded and sent to memory controller 504 where they are buffered for writing to the frame buffers. Memory controller 504 stores a complete field of information in memory 505 before transferring it to its respective frame buffers of frame buffer memory 506 where each field 601, 602, etc., stores a separate contiguous field of video. After a complete field is assembled into the frame buffer memory, the respective fields are transferred to the digital-to-analog (D/A) converters for writing to the respective write heads of the high-speed video recorder. Each of the 32 parallel operating pipelines of FIG. 5 are identical to the architecture shown in FIG. 6.

Figure 7:
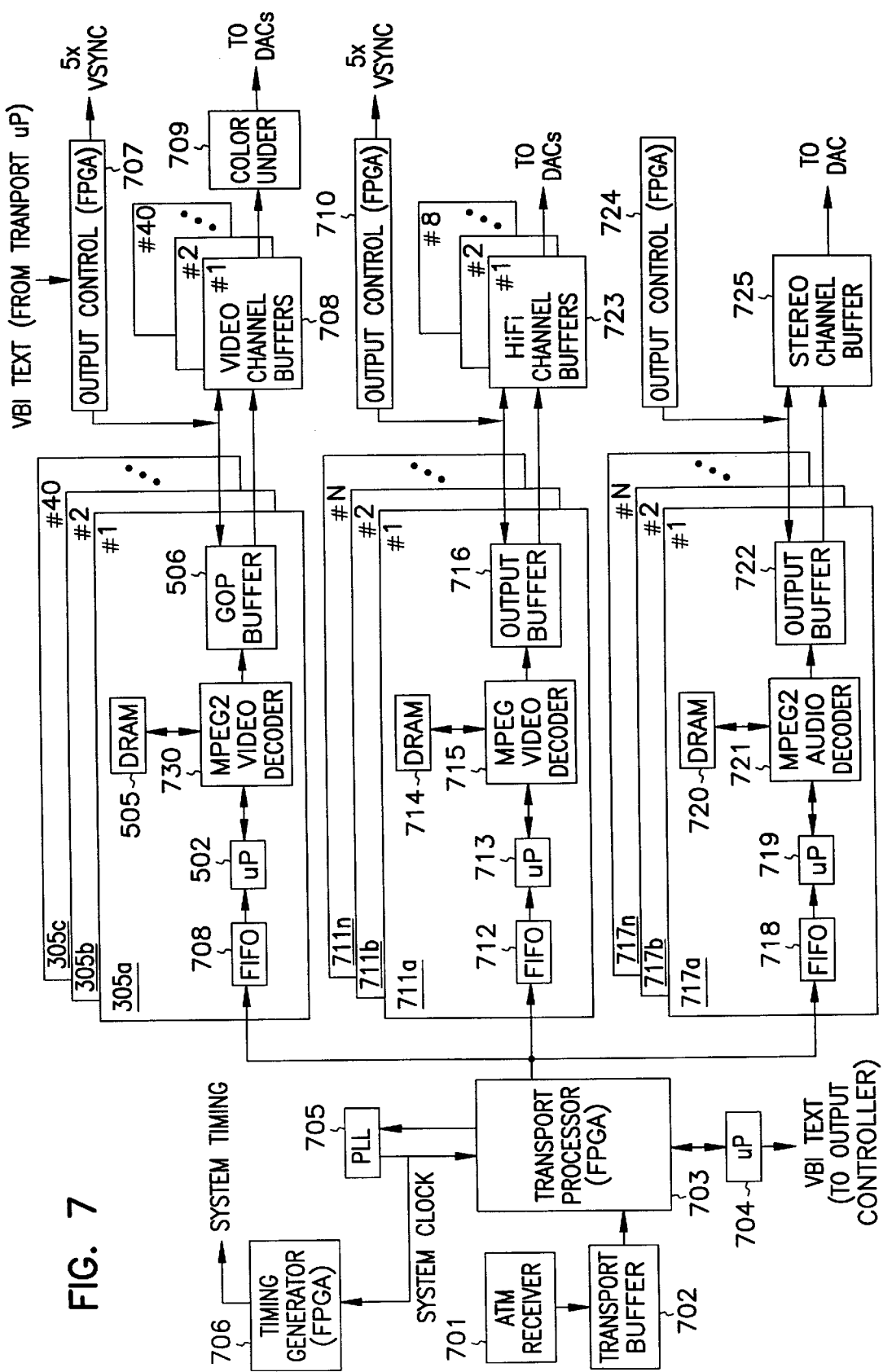
FIG. 7 is a detailed top-level architectural view of the decompression engine and its associated buffers of FIG. 3.

A detailed top-level architectural view of the decompression engine and its associated buffers of FIG. 3 is shown in FIG. 7. The parallel nature of the operation of the decompression engine is highlighted in FIG. 7 by showing the parallelism of the decompression engines for video and audio channels. The ATM receiver 701 is connected to the OC3 data stream from the ATM switch 125. The ATM receiver serially transfers the information through transport buffer 702 to the transport processor 703. Microprocessor 704 operates with the transport processor to strip out vertical blanking information and text to be reinserted into the vertical blanking interval of the resynchronized video signal using the output controller 707. The transport processor 703 is supported by the phase locked loop circuit 705 which generates all timing signals for the system including system clock. The system clock signal synchronized with the transport processor is fed to a timing generator 706 which provides overall system timing to all of the parallel processes to ensure that they operate in synchronization.

FIG. 7 shows the parallel operation of the multiple decompression engines for the video information and also shows two sets of parallel pipeline processors for re-creating hi-fi audio and linear audio tracks for the videotape. The video parallel pipeline processors 305a–305n shown to the top of FIG. 7 are as described above. Each of the parallel pipeline processors 305 include an FIFO buffer for receiving the serial information from the transport processor which is addressed to the specific pipeline which will decode the frames assigned to it. The serial information from FIFO buffer 708 is fed to the CPU 502 which passes the information to the MPEG-2 video decoder 7304 which corresponds to a portion of the memory control units 504 of FIG. 5. The MPEG-2 video decoder 730 is an off-the-shelf part commonly available in the video industry. Here the information is decoded into video pixel data where the fields of each video frame are assembled in the frame buffer 506 which is also referred to as a group of pictures (GOP) buffer. This information is then placed in video channel buffers external to the decompression engines for delivery to a D/A controller before writing to the video heads. The video channel buffers are fed through a color under unit to place the correct chrominance information into the data stream for reproduction on the video recorder by the recording heads.

Due to the parallel nature of the present invention, the architecture of the hi-fi audio section and the linear stereo sections of the decompression engine shown in FIG. 7 are very similar to the video pipeline sections shown to the top of FIG. 7. The hi-fi audio is written onto a VHS videotape on top of the video information using a separate frequency carrier through the helical scan recording heads. Thus separate recording heads are used for the hi-fi audio information than are used for the video information on a helical scan VHS recorder. The linear audio or linear stereo audio information is written in a linear track on the edge of the videotape using linear record heads and thus the linear audio information must be decoded separately from the hi-fi stereo information due to different frequency carriers.

The hi-fi audio decoder pipelines 711a–711n shown in FIG. 7 each process the hi-fi audio for a particular series of video frames. The information is received and processed similar to, and in synchronization with, the video parallel pipelines except that an MPEG audio decoder is used rather than an MPEG-2 video decoder 730. The same type of MPEG audio decoder 721 is used in the linear audio pipeline processors 717a–717n with the timing of the linear audio also corresponding to the video frames being decoded and written by the video recorder.

Hi-fi channel buffers 723 receive the hi-fi channel information which will be written by the helical scan heads for hi-fi audio while the linear audio information is stored in the stereo channel buffer 725 to be written by the linear audio heads of the high-speed VHS recorder.

Figure 8:
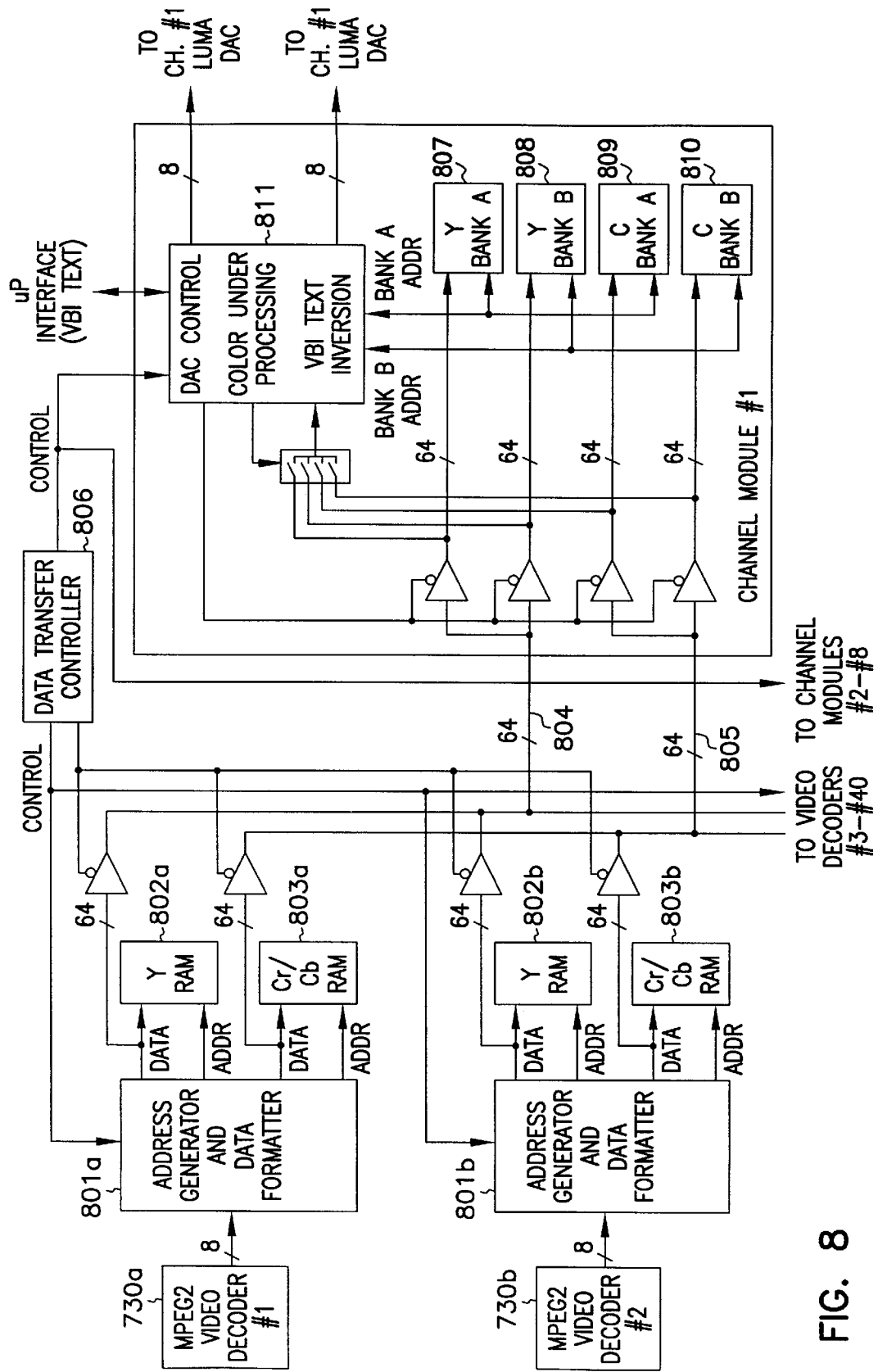
FIG. 8 is an even more detailed description of the video compression engine output section memory architecture for the video pipeline processors of FIG. 3.

An even more detailed description of the video compression engine output section memory architecture is shown in FIG. 8 for the video pipeline processors 305. Two of the parallel pipelines are shown but those skilled in the art will readily recognize how the description of FIG. 8 may be extended to describe and encompass all the parallel pipeline operations and their synchronous control.

The output of an MPEG-2 video decoder 730a is fed to an address generator and data formatter to begin reformatting the frames of video information. Sixty-four bit wide data buses are used to transfer assembled video information to the output sections. The address generator and data formatter 801 separate the luminance and chrominance data from the data stream received from the MPEG video decoder 730. A luminance RAM memory 802a receives and stores the address and data information for the particular video field of information being processed at that particular moment. Concurrent with this operation, the chrominance information is stored in chrominance memory 803a for the same field of video information. Once assembled, these parallel frames of information are transferred via the luminance and chrominance data buses 804 and 805 respectively under control of the data transfer controller 806. This synchronous information is stored in pages of static random memory 807 and 808 for luminance information and 809 and 810 for chrominance information. This information is buffered and then processed by the digital-to-analog control circuit 811 which includes the color under processing and the vertical blanking interval text insertion functions. All this information is combined and passed as digital information to the separate luminance and chrominance D/A converters. The chrominance and luminance information in an analog form is combined for recording by the respective recording heads of the high-speed VHS recording device.

40× High-Speed Writer Hardware

The high-speed VHS writer records a standard NTSC or PAL VHS videotape into SP (standard play) speed at 40 times the normal speed. This recording includes hi-fi audio and linear audio tracks. Those skilled in the art will readily recognize that although in the preferred embodiment and in this detailed description of the preferred embodiment, an NTSC or PAL VHS system is described, the present invention is readily modifiable to other formats of helical scan recorders such as beta cam, eight millimeter, U-matic, one inch and other videotape formats.

Figure 9:
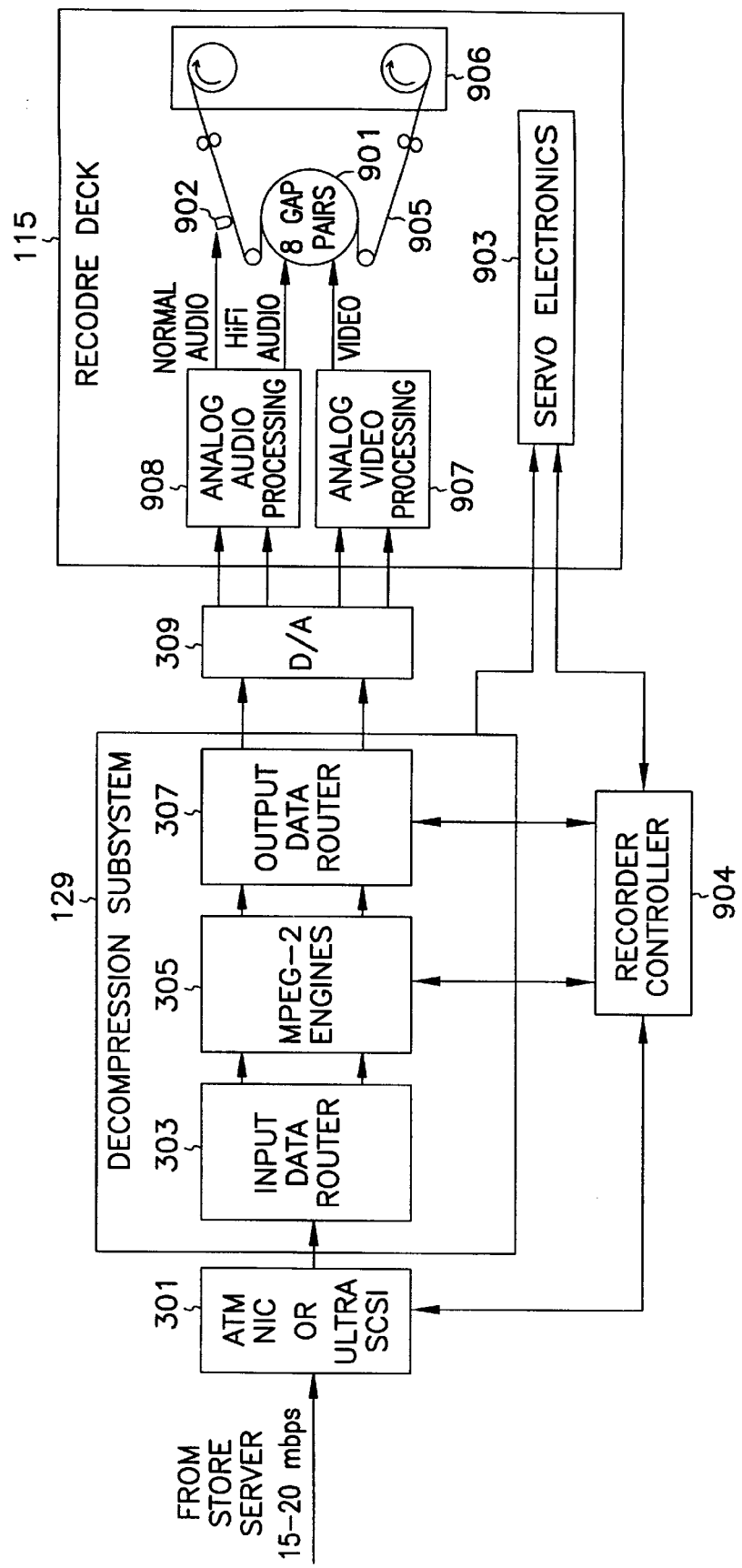
FIG. 9 is a diagram of the high-speed video writer hardware.

The high-speed video writer hardware 115 shown in FIG. 9 has a helical scan head 901 which contains 16 video and 16 hi-fi audio heads arranged as gap pairs such that there are eight gap pairs of video and eight gap pairs of hi-fi audio heads in contact with the tape at all times. Eight of each video and eight of each hi-fi heads are recording simultaneously. Each of the eight video heads records a different video field while each of the eight hi-fi audio heads record a different audio segment. The RF spectrum to the video and hi-fi audio heads is five times the normal speed whereby the linear tape speed is 40 times the normal tape speed. Linear audio recording recorded by the linear audio record head 902 is at 40 times the normal speed. The control track on the videotape is also recorded by audio control head 902 at 40 times the normal tape speed.

The servoelectronics subsystem 903 interfaces with the decompression subsystem 129 and the recorder controller 904 to synchronize the transfer of video and audio information to the helical scan head 901 and the movement of the tape 905 from cassette 906. The analog video processing circuitry 907 receives the eight parallel video frames as serial analog information from digital-to-analog converter circuit 309 to provide it to the eight record heads to simultaneously write eight frames of information at a time. In a similar fashion, the analog audio processing circuitry 908 receives eight hi-fi audio analog signals in parallel for placing the hi-fi audio information on the audio subcarrier for writing by the eight hi-fi audio heads of the helical scan head 901. Also, analog audio processing circuit 908 receives the linear audio tracks at 40 times the normal speed for writing the audio information through to the videotape 905 via audio head 902.

Figure 10:
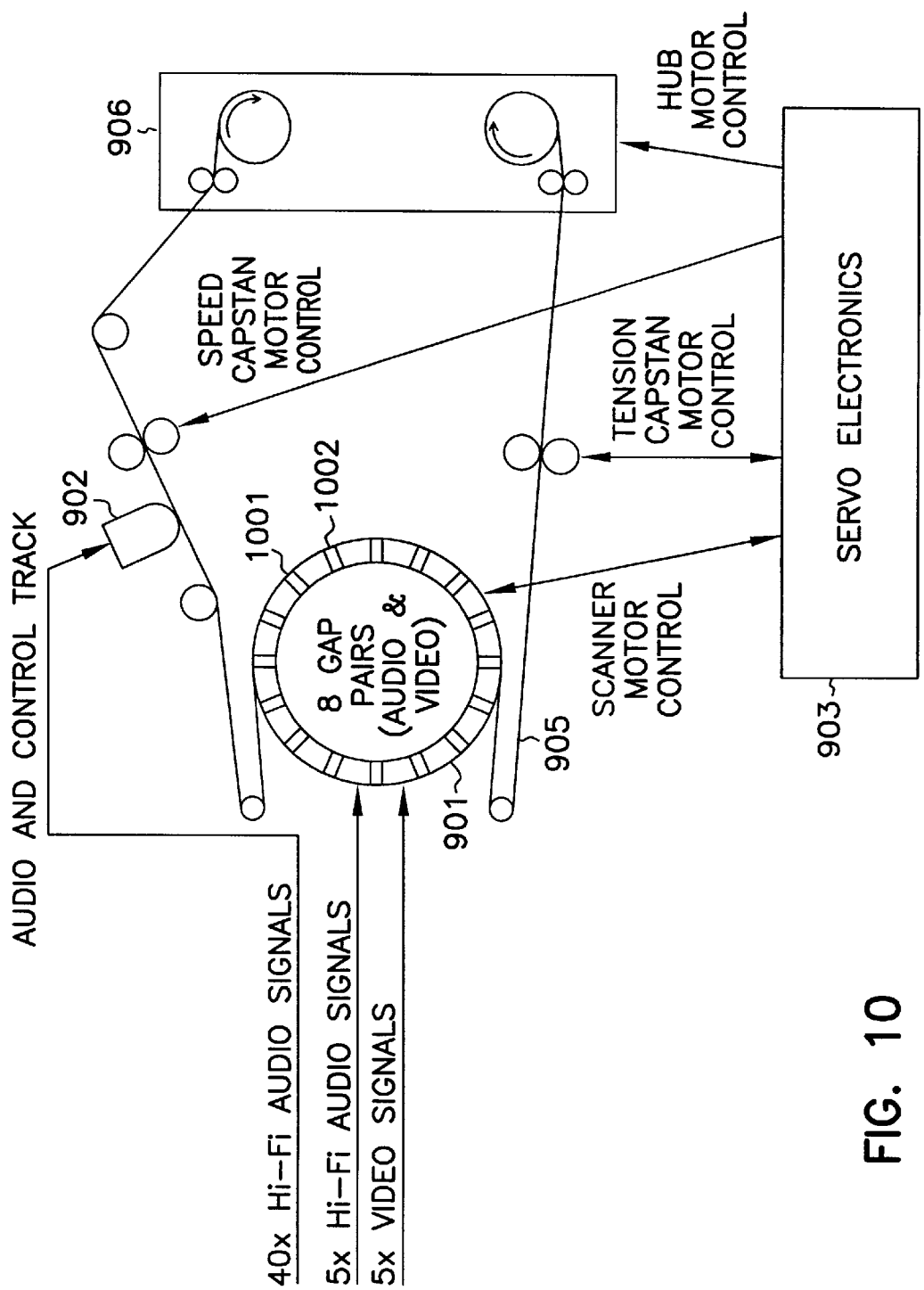
FIG. 10 is a more detailed diagram of the operation of the high-speed recorder of FIG. 9.

FIG. 10 is a more detailed diagram of the operation of the high-speed recorder 115 of FIG. 9. The helical scan write head 901 contains eight gap pairs for hi-fi audio and eight gap pairs for video recording in which only eight record heads for video and eight record heads for hifi audio are in contact with the tape at any given moment. A video record head 1001 shown in FIG. 10 is simultaneously writing a field of video information at the same time that video head 1002 is also writing. The frequency at which these heads are writing information is five times the normal carrier frequencies for encoding the analog information onto the videotape 905. Head 901 is carefully machined and angled such that the correct azimuth angle of the information recorded on tape 905 corresponds to the azimuth angle required for playback at normal speeds. Careful control of the tape speed is accomplished through servoelectronics 903 to ensure compatibility with playback of the recorded information at standard speed on a standard VHS videotape player.

Figure 11:
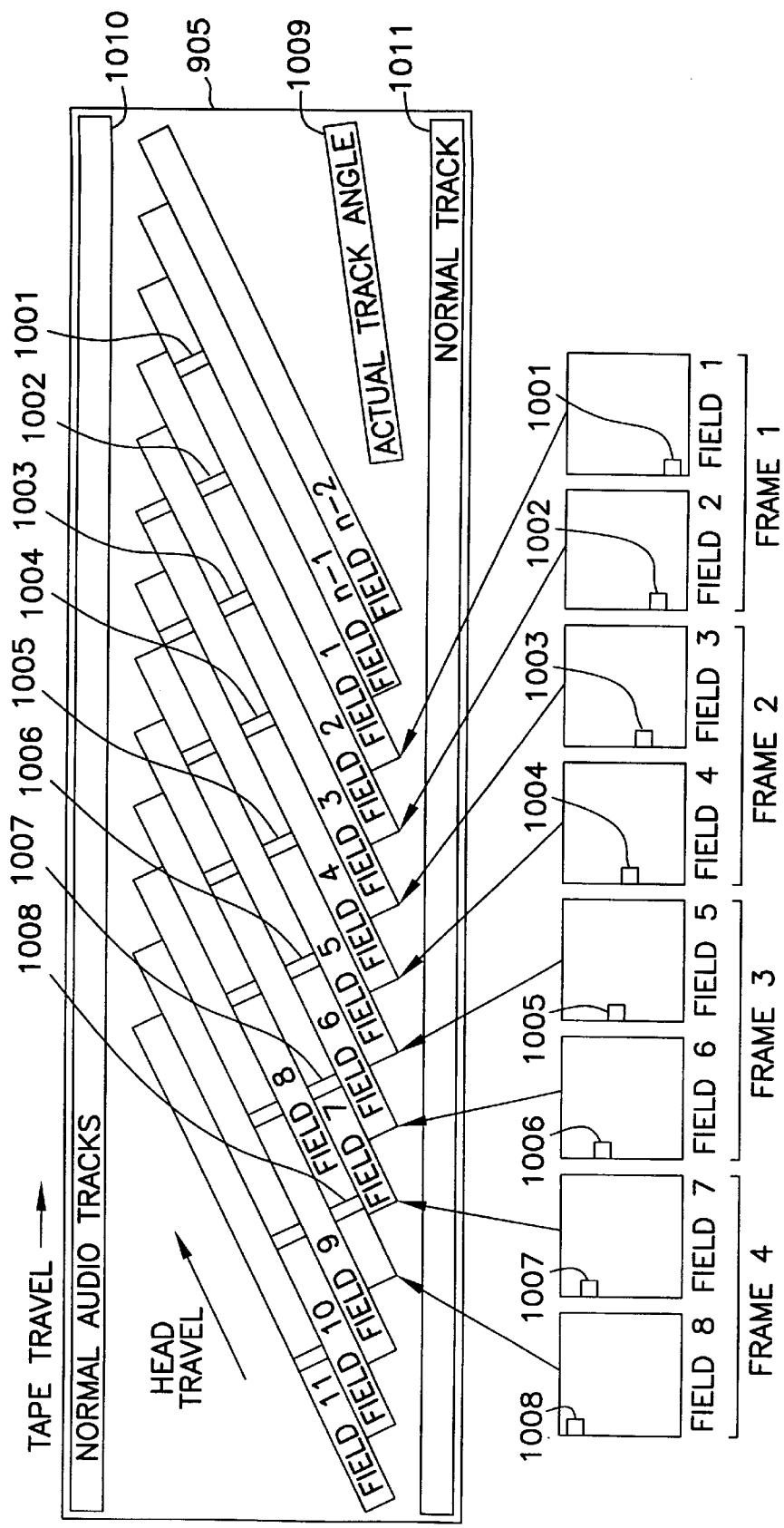
FIG. 11 is a detailed view of the video tape showing the video fields and audio fields recorded on the tape with the simultaneously recording heads.

FIG. 11 is a detailed view of tape 905 showing the video fields and audio fields recorded on the tape with the eight simultaneously recording heads. The video heads are shown in the lower half of FIG. 11 with the approximate relative location of the recording heads on the helical drum 901 in order to simultaneously write the eight fields of analog video information simultaneously. Each frame of video information is actually made up of two fields of interlaced information which are separately written on the videotape 905. This interlacing is part of the NTSC and PAL video standards. The information written onto the videotape corresponds to these video standards and corresponds to the VHS standard for azimuth angle, carrier frequency and tape speed on normal playback.

Video recording head 1001 records onto field 1 shown on videotape 905. Video head 1002 records field 2 onto videotape 9005 and the remaining heads record as shown in FIG. 11. Those skilled in the art will readily recognize that hifi audio information (not shown) is recorded on top of the video information on a standard videotape 905 using a different carrier frequency and different azimuth angle so as to not interfere with the video information recorded beneath the audio information.

The relative locations of the video record heads 1001–1008 are also shown as they appear during normal tape travel on videotape 9005. The actual track angle 1009 of the tape heads on helical scan record head 901 is shown by example on the tape 905 at 1009. The linear audio tracks 1010 whether they are stereo or monaural are recorded at 40 times the normal speed and are recorded at the standard location 1010 at the top of videotape 905. Also the control track 1011 containing synchronization information for facilitating proper playback of the video information is placed at the standard location 1011 at the bottom of videotape 905 as shown in FIG. 11 and is also recorded as described above at 40 times the normal speed.

Figure 12:
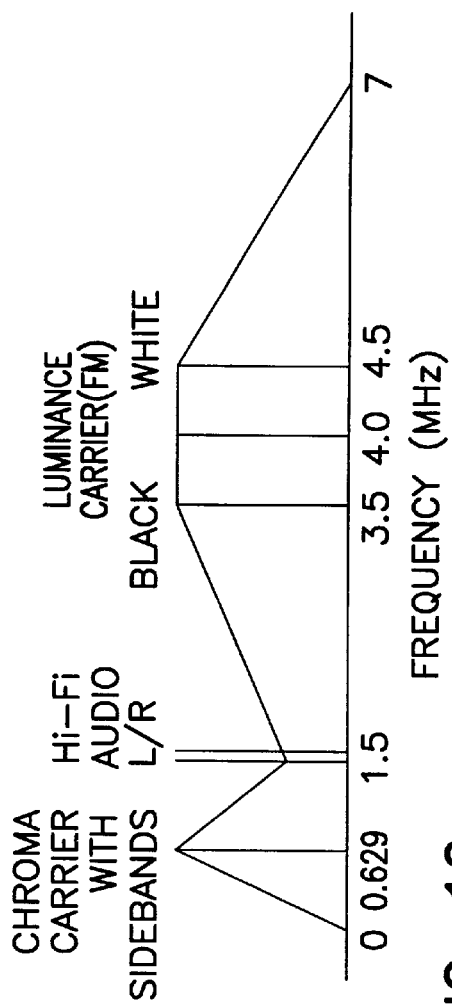
FIG. 12 is a diagram of the normal VHS frequency spectrum on the tape for recording the chrominance, luminance and hi-fi audio information.
Figure 13:
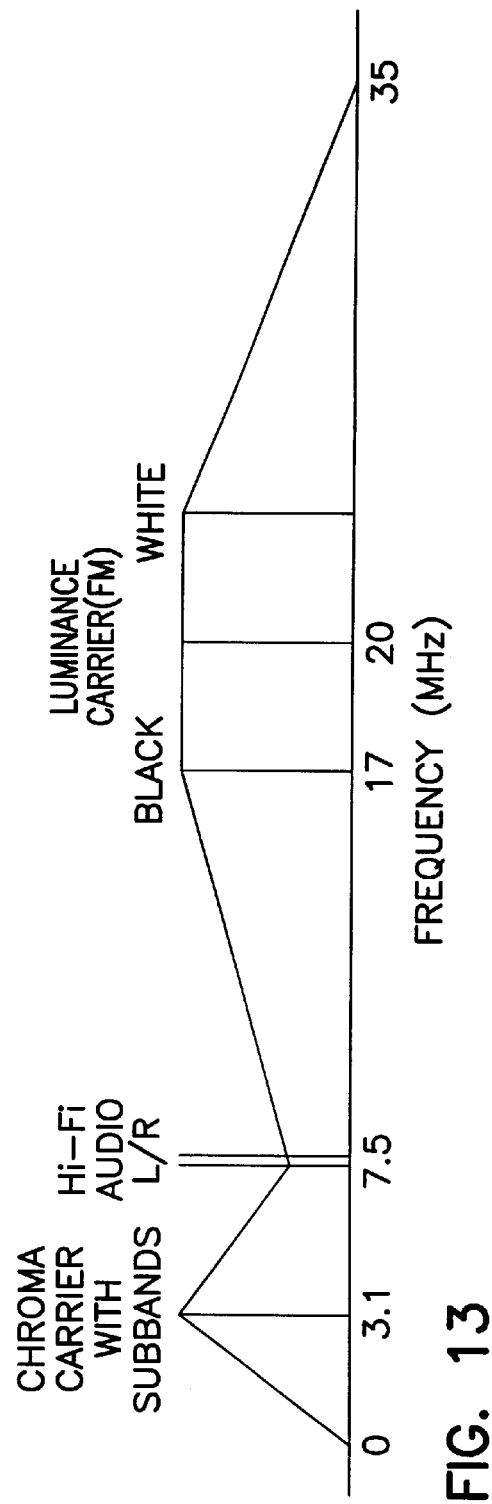
FIG. 13 is a diagram of the enhanced frequency spectrum used for recording the chrominance, luminance and hi-fi audio information onto the video tape at higher tape travel speeds.

FIG. 12 shows the normal VHS spectrum on the tape for recording the chrominance, luminance and hi-fi audio information. The standard chroma carrier with sidebands is located at 0.629 megahertz, the hi-fi audio left and right channels are recorded at approximately 1.5 megahertz, while the center luminance carrier is at 4 megahertz. In order to write the normal VHS spectrum on the tape at five times the normal recording speed, the carriers must be recorded at five times the normal frequency so that the playback is according to the frequency spectrum required in FIG. 12. This enhanced frequency spectrum is shown in FIG. 13 as a high-speed spectrum to tape graph. In this fashion, the chroma carrier for color under with sidebands is centered at 3.1 megahertz, the left and right hi-fi audio carriers are located at approximately 7.5 megahertz and the center carrier for the luminance information is elevated to 20 megahertz. These, of course, are the recording speeds shown in FIG. 13, however, since the information is written at five times the normal speed, the playback will exhibit the frequency spectrum shown in FIG. 12 when the tape speed is played back at normal SP speed.

The present system may operate with different video standards without departing from the spirit and scope of the present invention. Digital videotape, for example, may also be written with the present invention by directly writing the digital video information rather than placing it on chroma and luminance subcarriers. Digital video disk information may also be directly written in a high-speed fashion using the concepts of the present invention with the decompression engine.

Included in the tape handling for the high-speed recorder 115 are additional tape heads to clean and polish the tape to allow refurbishing and re-use of tapes returned from rental. A cleaning wiper removes loose dirt, oxide and other debris to clean the tape to assist in removing any temporary dropouts. In addition, a burnishing tape is used to polish the surface of the videotape for improving the videotape surface for high-speed recording.

Another feature of the present invention is the tracking of tape rental and sell-through information by direct recording of relevant information onto the header or trailer of the videotape in the control track or audio track using linear record head 902. Information recorded are items such as the number of times the videotape has been used, the person who has rented the videotape and a history of its re-use. This information can also facilitate copyright control and tracking of counterfeiting since this information would inadvertently be copied onto the next videotape copy providing a trail to the origins of the counterfeit copies. Those skilled in the art will readily recognize that the vertical blanking interval of the video signal could also be used to record such information.

In order to record at such high frequencies shown in FIG. 13, each write pair head is required to be spaced at six millimeters maximum spacing. The tape moving at 29 meters per second with a scanner head diameter of 64.40 millimeters at a tilt of 5°42'27". The specifications for the high-speed recorder compared to a normal-speed recorder are shown in Table 1.

TABLE 1

Specifications for the High Speed Video Writer

| | Normal Speed | High-Speed |
|---|---|---|
| Linear tape speed | 1.31 ips (33.35 mm/s) | 52.4 ips (1.334 m/s) |
| Writing Speed | 228.5 ips (5.8 m/s) | 1142.5 ips (29.02 m/s) |
| Bandwidth | 129 KHz to 7 MHz | 645 KHz to 35 MHz |
| Octaves | 6 | 6 |
| Luminance BW | 3.4 to 4.4 MHz | 17.0 to 22 MHz |
| Chrominance BW | 129 KHz to 1.5 MHz | 645 KHz to 7.5 MHz |
| FM auto. subcarrier | (L)1.3 MHz (R)1.7 MHz | (L)6.5 MHz (R)8.5 MHz |
| Scanner rotation | 1800 RPM | 9,000 RPM |
| Scanner tilt | 5° 56' 7.4 | 5° 42' 27" |
| Scanner diameter | 62 ± 0.01 mm | 64.40 mm |
| Number of heads | 4 | 32 |
| Head spacing | 48 mm | 6 mm |
| Number transformers | 10 | 16 |

Since the tapes are recorded numerous times (up to 500 uses) and a normal cycle for a tape is to record and then play between one and ten times, the tapes need to refurbished between each use. The tape quality is assessed prior to recording by inspecting the tape at high speed before erasure. An optoelectronic detection system locates edge damages, wrinkles, creases in the tape, inspects for surface damage and the like. To make the refuirbish and re-use system more efficient, the customer is requested not to rewind the tape upon last use so that the recorder subsystem 115 can rewind the tape and inspect it simultaneously. Along with the inspection, the tape can be cleaned and refurbished using the aforementioned refurbishment drum and wiping fingers. If upon rewind, the electrooptical inspection system detects damage beyond a preselected threshold, the tape is discarded.

In the preferred embodiment, the tapes used with the present system may be standard high quality video tapes available from a variety of manufacturers. Those skilled in the art will readily recognize that video tape specially constructed to survive the rough handling required by the 40x tape writing subsystem 115 may be advantageous to extend the useful life of rental tapes. In a specially construct video tape, the cassette shell is modified to improve the strength of the hubs, the upper and lower hub flanges, the tape guides and the shell could include a special cassette identification hole to distinguish it from standard VHS cassettes. The tape formulation may also include an improved binder, improved magnetics and improved surface quality.

Figure 14:
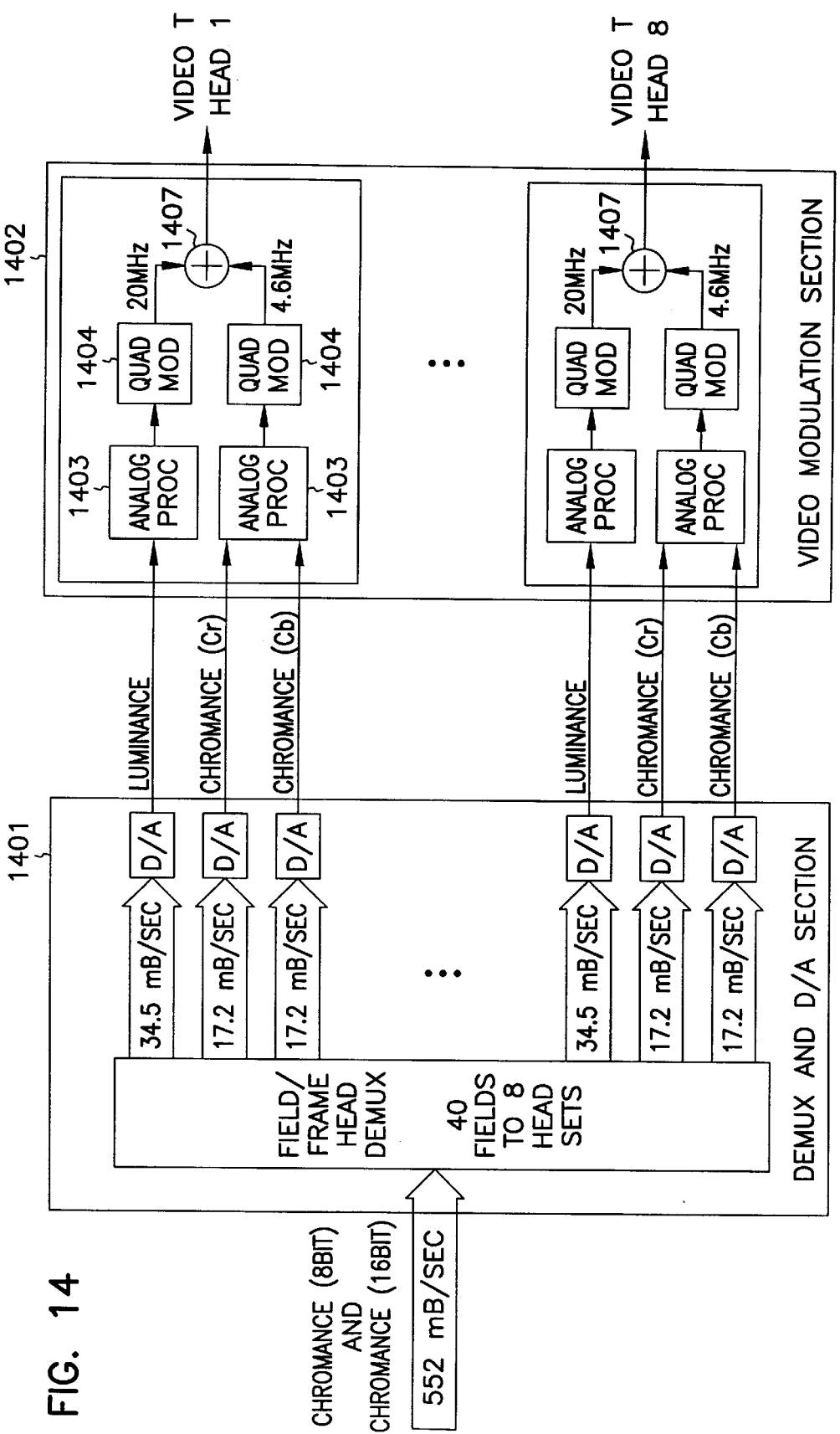
FIG. 14 is a diagram of the individual video data and analog information paths for the eight video heads described in FIG. 11.

The individual video data and analog information paths are shown in FIG. 14 for the eight video heads described in FIG. 11. The eight bit chrominance and eight bit luminance information is received from the MPEG-2 video decoders and demultiplexed into the appropriate field and frame information as shown in FIG. 14. The demultiplexing and digital-to-analog decoder section 1401 shown in FIG. 14 corresponds to the output data router 307 and D/A converter section 309 as shown in FIG. 3. The 27.2 megabit per second chrominance signals and the 34.5 megabit per second luminance signal for each video head are demultiplexed and sent to digital-to-analog converters to produce the analog luminance and chrominance signals for writing by each videotape head. The luminance and chrominance information, of course, is modulated according to the carriers described in FIG. 13 by a video modulation section 1402. The luminance carrier information is processed by analog processing circuit 1403 and modulated using FM modulator 1404 to produce the 20 megahertz FM luminance carrier signal for the video head. The two chrominance signals with side band information are processed by a chrominance analog processing circuit 1405 and are quadrature modulated through quadrature modulation circuit 1406 to produce the chroma carrier color under signal. The chrominance and luminance carrier signals are combined by signal combiner 1407 and the resultant signal is fed to the appropriate video head for recording by the helical scan record head 901. This signal path shown in FIG. 14 is duplicated for each of the eight video heads. A similar system is used for the hi-fi audio information.

Robotic Tape Handling Cabinet

Figure 15:
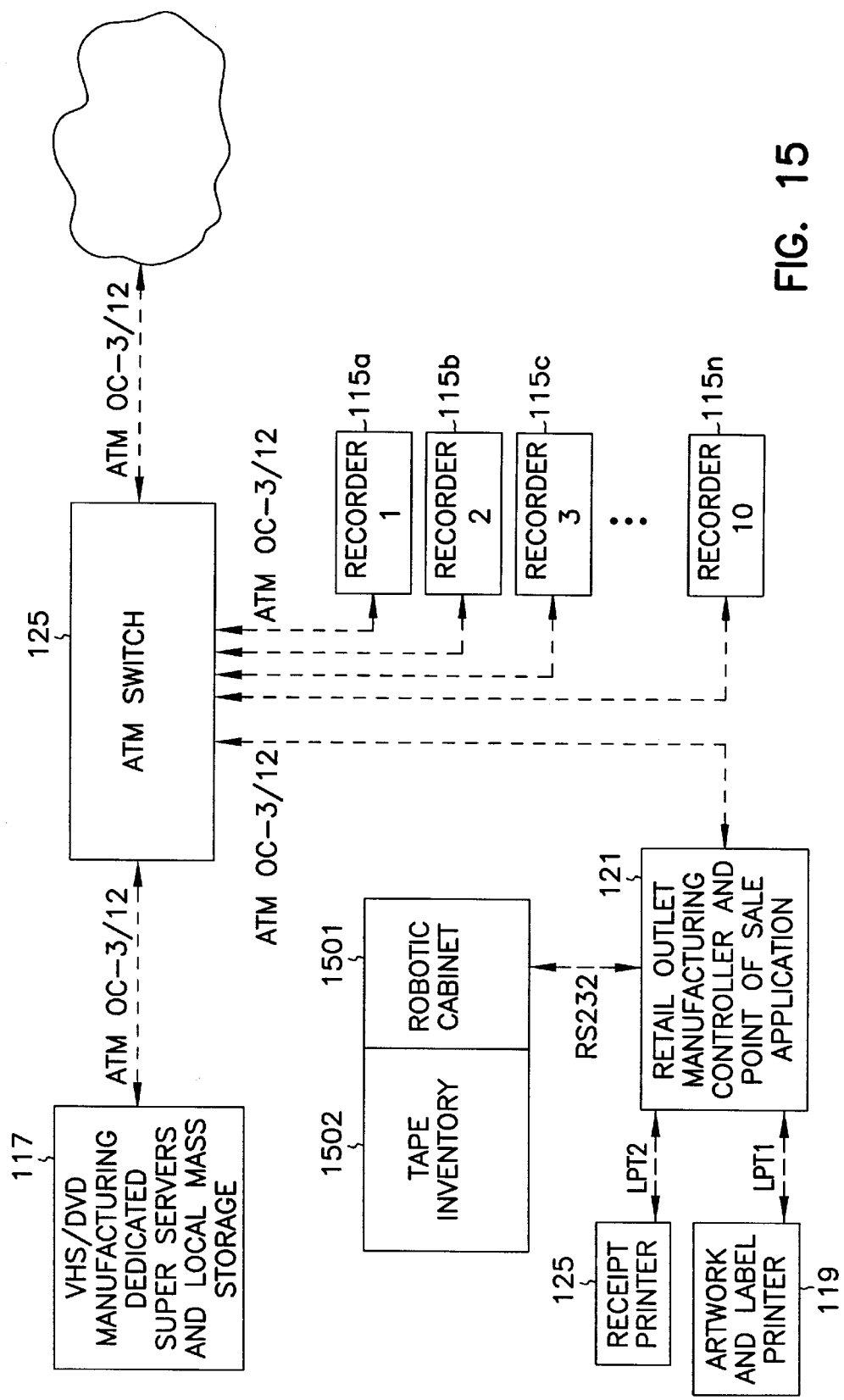
FIG. 15 is a diagram of a plurality of high-speed video recorders combined into a single robotic cabinet.

A plurality of high-speed video recorders 115 can be combined into a single robotic cabinet 1501 shown in FIG. 15. A VHS tape inventory 1502 contains in the preferred embodiment 500 tapes in a storage cabinet with a robotic mechanism for loading and unloading any one of the tapes from any one of the plurality of high-speed recorders 115. The robotic cabinet 1501 is controlled through an RS232 interface by the retail outlet manufacturing controller 121. Many of the tapes contained in robotic cabinet 1501 have been previously recorded with popular movie titles and hence do not need to be re-recorded if a customer requests the identical title. If once recorded with a popular title of a recently released movie, and returned by a customer, the tape is first checked and refurbished in one of the high-speed recorder units 115 and then stored in an unerased form in robotic cabinet 1501 for later re-rental to a second customer. A pre-recorded video tape may be overwritten by the high speed video recorder 115 by incorporating flying erase heads on helical write drum 901.

The manufacturing server 117 with the movie cache is also connected through the ATM switch 125 to one or a plurality of high-speed recorders 115 for manufacturing a videotape. In such a case, a blank video cassette is removed from the tape inventory by the robotically controlled mechanism to load the tape into one of the plurality of high-speed recorders 115 for manufacture of the requested title. In the preferred embodiment, the resulting recorded VHS NTSC tapes meet the industry standard requirements as specified in SMPTE and ANSI document number V98.32M and SMPTE RP 142 and 148, which are hereby incorporated by reference.

High Speed Recorder Transport Mechanism

The high speed VHS recorder 115 is based upon a commercially available Panasonic AG6850 VHS Hi-Fi duplicating recorder. This is a special recorder used for round the clock duplication operations for producing commercial videotapes. The record heads as described in the specifications given in Table 1 will operate at 9000 RPM and are of a different size than the standard VHS record heads. The capstan and pinch roller assemblies are replaced by capstan and pinch roller assemblies found in the Panasonic DS840–850 VHS broadcast studio machine which is designed to run at 32 times speed. All of the servos and servo controllers are as originally found in the Panasonic AG6850 VHS Hi-Fi duplicating recorder but are operated at a higher speed. The recorder is designed to operate at frame rate of approximately 1200 Hz.

Although the combined mechanisms of the aforementioned Panasonic recording devices can be used in the preferred embodiment of the present invention, a wholly different helical scanned recording head is required. A helical scan recording head is made up of a lower drum and upper drum with a machined tape guide "fence" machined into the tape drum at the helix angle of 5° 42 minutes 27 seconds. The lower drum contains the bearing assembly with two sets of preloaded duplex ball bearings on the outer surface of the rotor shaft. The rotor shaft is hollow and contains sixteen pairs of wires connected to the eight head pairs of the recording drum. The sixteen pairs of wires run to the lower part of the shaft where a magnetic rotary transformer is used to transfer the analog information between the rotating head and the fixed support platform. Those skilled in the art will readily recognize that a variety of mechanisms can be used to transfer the electronic signals to the rotating head including a capacitive length, slip rings, optical links and a wide variety of types of magnetic rotary transformers.

Sixteen record amplifiers are required to drive the 16 record heads on the rotor. The record amplifiers with an operational bandwidth capable of handling both the color under signal and the luminance signal. The inductance for each record head is approximately one micro-henry and has a resonance above 35 MHz. At 20 MHz this is an impedance of approximately 200 ohms and when put in series with its mating head will present an impedance of about 400 ohms to the write driver. Thus the current required to drive each head is approximately 20 milliamps peak-to-peak or 8 volts peak-to-peak cross the head.

The capstan servo speed moves the tape at a nominal speed of 1.334 meters per second when recording. In order to bring the tape up to speed for 40× recording, the leader on the tape must be at least one meter long before speed is stabilized. The Panasonic AG 6850 VHS recorder is capable of moving the tape as such speeds and the capstan and servo mechanisms can support such a speed. This Panasonic AG 6850 recorder can rewind a two hour tape in under three minutes which infers an average tape speed of 1.363 meters per second. The speed of the 40× VHS writer is 1.334 meters per second which is well within the capabilities of the servo mechanisms and capstans of the Panasonic unit.

The helical scan write cylinder uses a higher powered motor to overcome the higher inertia required for a larger and heavier write cylinder head. The servo controller 903 shown in FIG. 10 controls the helical scan write head 901 by taking the frame synchronization signal from the decompression electronics and dividing it down to use as a phase control signal to control the servo accurate enough to control the speed of the write heads at five times normal speed.

The linear record head must operate at forty-times the normal frequency and thus the higher frequency requires a different audio and control track head with a lower impedance than is normally found in a VHS recorder. The audio base band of the linear audio record head is 2 KHz on the low end and 400 KHz on the high end. The bias frequency of a normal record head is approximately 35 KHz however to record at 40× speed, the bias frequency is approximately 1.4 MHz minimum. The bias frequency of the linear audio and control record head is close to the frequency range of the video signal and the Hi-Fi audio signal however since the linear audio and control head is located several inches away from the helical scan video record cylinder, the bias signal does not effect the recording of the video and Hi-Fi audio signals.

ATM Switch and Communications Network

The present invention, both in the host data center 10 and in the retail manufacturing site 20, require high bandwidth communications of a reliable nature. Fiber optic communication is used throughout both sites in the form of a synchronous transfer mode (ATM) network. Between the host status center 10 and the retail site 20, a commercial fiber optic long line communication connection is used between the ATM switches as shown in FIG. 1. For example, the present invention uses a data stream of 155.52 megabit per second to transfer the MPEG-2 data stream representing the compressed movie. In the preferred embodiment of the present invention, standard off-the-shelf ATM network interface cards are used to provide the required rated speed between commercially available work stations and personal computers. These types of off-the-shelf ATM network interface cards are available from such companies as Adaptec, Fore Systems and Efficient Network Solution.

All of the components shown in FIG. 1 communicate with one another using the ATM fiber optic network through ATM NIC card interfaces and OC-3 optical cabelling between the locations. The dedicated servers of FIG. 1 are commercially available personal computers operating at the highest commercially available speed. For example, the movie cache server 117 is a dedicated superserver available from such companies as Digital Equipment Corporation or other vendors with a large array of disk drives for storage of the four gigabyte movie files in the local cache. The disk drives of the server 117 could be of a variety of types including SCSI RAID drives commercially available and known to those skilled in the art.

Movie Preview and Selection Kiosks

The movie kiosks of FIG. 1 are available to the customer for new customer registration, customer sign on, video trailer preview, video rental and video sell-through. Each retail outlet 20 will support from one to twenty kiosks. The kiosks are used by the customer using touch screen technology for ease of use. Each kiosk is interfaced to the host data center 10 through the manufacturing controller 121 over the ATM network. The kiosk screens in idle mode will display graphic advertisements, talking head information, and may cycle through different movie trailers. Should a customer wish to access the kiosk, the customer can touch the screen to activate a login procedure. The customer may either enter a new customer information screen or enter his or her existing PIN number to go right to the video category selection screen.

The movie kiosk can display movie selections within categories or based on new release date or even a personal preference screen based on the data entered when the customer initially registered with the system. A personal preference screen can be invoked by the user to either search and select movies of their particular tastes or request suggestions based upon their statistical past history of selections.

The kiosk is capable of displaying a search screen to locate movies based upon a fuzzy logic search criteria to assist a customer locating a movie based upon some obscure references. Upon selection of a movie to purchase or rent, ordering information, pricing a sales window will appear in which the purchase can be completed and the manufacturing of the movie initiated. In addition, the kiosk can be used to preview 30 to 60 second movie trailers of the movie selected for potential purchase or rental.

Each of the kiosks are implemented using a Microng® 100 MHz P5 processor equipped with 16 megabytes of memory. The touch screen display as in the preferred embodiment is 640×480 SVGA true color monitor driven by a 640×480 SVGA display adapter operating at 16 million colors. A 16-bit stereo adapter is also part of the hardware specification along with a 32 bit MPEG-2 decoder adapter for decoding and displaying the movie trailers. The movie trailers stored at the host data center are not stored as compressed and parallel encoded movies such as the full length movies that are needed for parallel recording of the highspeed VHS recorder 115. The trailers are in a ready form for display by the kiosks and hence do not require the type of 40× parallel compression used for the full length movies.

The operating system in the software specifications for each kiosk are based upon a Merling® OS2 system with a software based upon IBM VisualAge® C++ using object oriented methodology. The software includes external libraries including the warp kernel tool kit and the IBM C++ multimedia development suite. The kiosk application software uses the IBM open class profile for parameter support during application and initialization. A single parameter initialization file, MVSPINIT.INI is used by the Kiosk application and subsystem software including database and network support libraries. Table 2 is a description of the kiosk application layer with a software layer described in a hierarchy.

TABLE 2

Kiosk Application Software Layers

| Kiosk Application MVSKIOSK.EXE | | |
|---|---|---|
| Communications Library MVSATM.DLL | | Database Library MVSDB2.DLL |
| | VisualAge Open Class Libraries DDE4XXXX.DLL | |
| Kiosk Parameter Initialization File MVSPINIT.INI | Talking Head MPEG-2 | Video Database MSVSIDEO.DBF |

Figure 16:
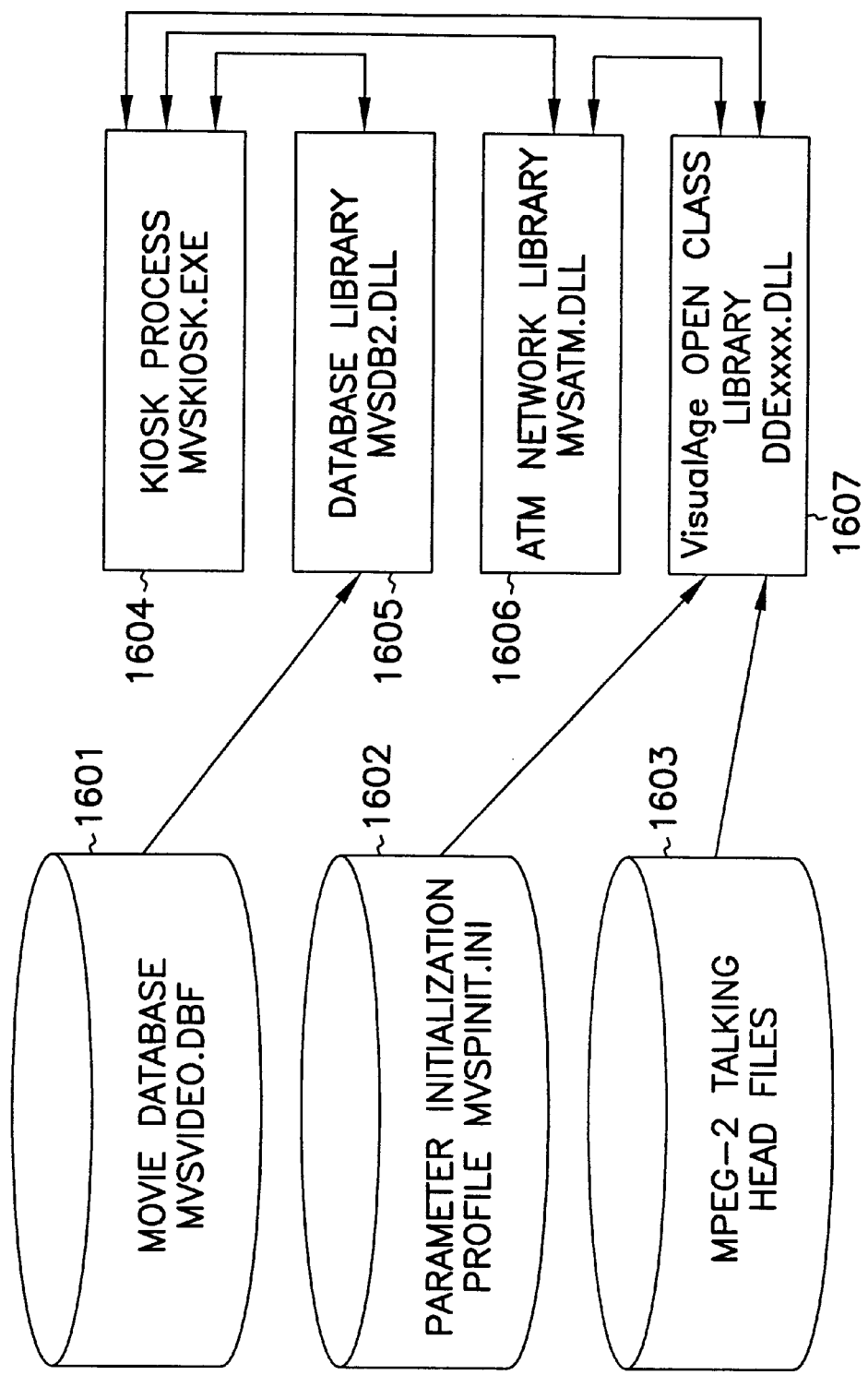
FIG. 16 is a diagram of the kiosk process and database flow.

FIG. 16 shows the kiosk process and database flow. The kiosk application starts by reading the MVSPINIT.INI file for parameter initialization. A simple network interface test is executed in the beginning of initialization to ensure that all support libraries are loaded and operational and the network is available. The network test is limited to communication with the retail manufacturing controller 121 which maintains a visual status of all kiosk activity. As described above the kiosk normally operates in an idle mode waiting for a customer interaction. When a customer begins interacting with the kiosk, the kiosk may use touch screen or voice recognition to provide input from the customer to the kiosk. The kiosk communicates with the customer using a talking head MPEG-2 video as shown in file 1603 of FIG. 16 to provide directions and instructions to the customer.

A local store of the movie database with all available movies 1601 is kept locally on the kiosk and updated periodically by the host status center 10. The kiosk process 1604 interacts with the database library 1605 to provide search capabilities and information regarding all movies available for purchase or rental. In the preferred embodiment of the present invention the talking head video is in a smaller quarter screen window with a resolution of 352×240 at a 3.9 megabit per second sample rate.

Figure 17:
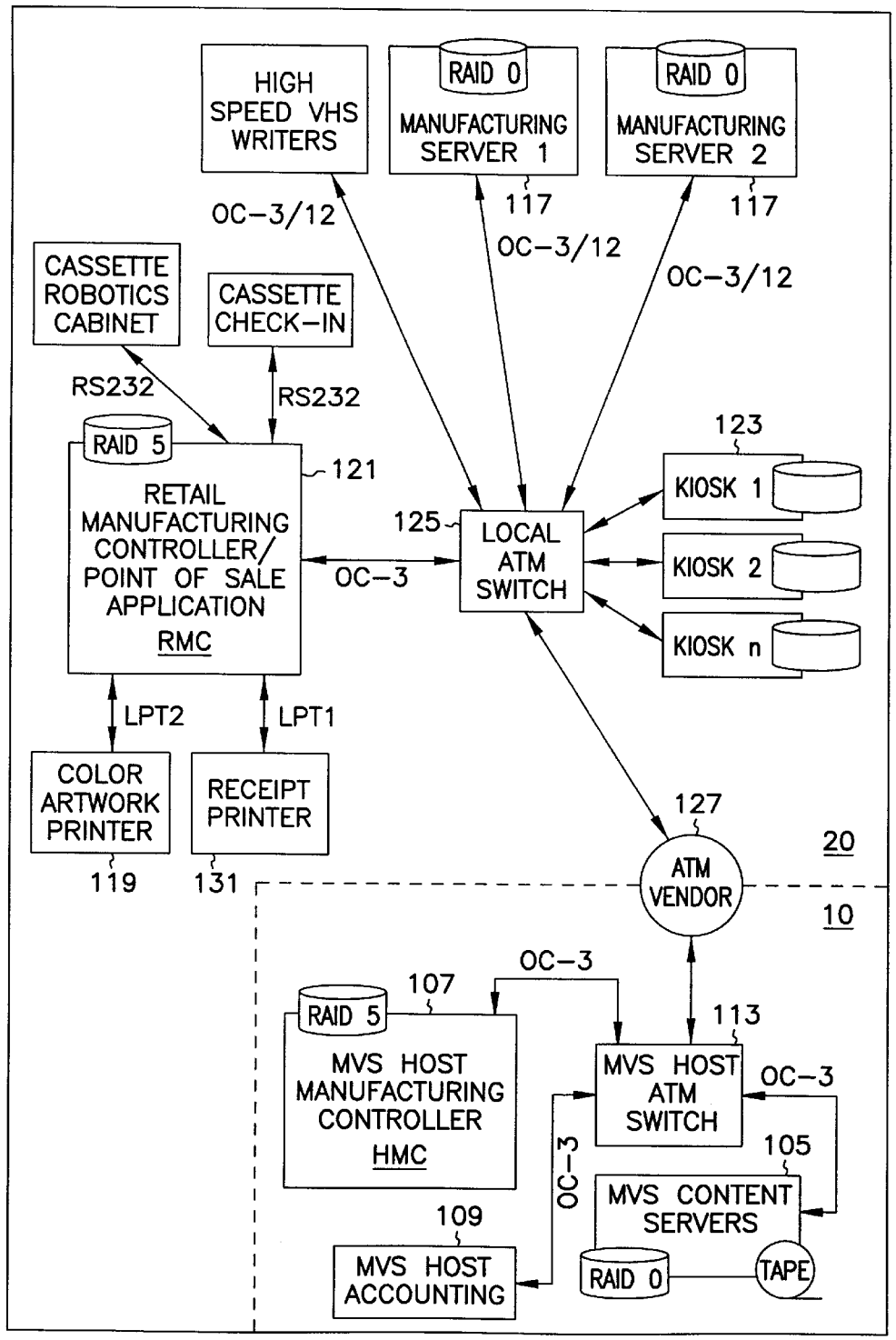
FIG. 17 is a diagram of the operation flow of the retail outlet manufacturing process.

FIG. 17 shows the operation flow of the retail outlet. The retail outlet manufacturing controller 121 operates as the central controller for the entire retail system at this site. As shown in FIG. 17, more than one manufacturing server 117 maybe controlled by the manufacturing controller 121 there by facilitating modular growth based upon customer demand.

Upon sign-in on a kiosk 123, the customer's request is transmitted through the local ATM switch 125 to the retail manufacturing controller 121. The information is held in a queue at the retail manufacturing controller 121 and a customer inquiry request is sent to the host manufacturing controller 107 over the ATM switch 125. At the host manufacturing controller 107, the customer database is queried and the customer information is validated including, by way of example, checking for outstanding credit information and outstanding balances. By keeping the customer database at the central host manufacturing site 10, customers may register in any one video retail outlet 20 and be able to use any other of the plurality of video retail outlets in any other part of the world as long as the customer is registered at the central site 10.

At the kiosk 123, the customer can search for movies on title, director, actress, actor, scene etc. The customer is allowed to preview the movies and to order the movies for rental or sell-through. If the customer requests a preview of the movie, that request will go to the retail manufacturing controller 121 and the retail manufacturing controller makes a determination whether the preview is kept locally in the cache of the store or wether it needs to be downloaded from the host data center 10. If the preview is kept locally, the manufacturing controller 121 supplies the movie trailer or preview information to that particular kiosk were it is buffered and played simultaneously. If the movie preview is not kept locally, the retail manufacturing controller 121 will send a request back to the host data center 10 to the host manufacturing controller 107 to download the movie trailer from the host content servers 105. Once the preview is available, the customer can preview the movie.

If the customer places an order to rent a movie at the kiosk, all information regarding the transaction is transmitted to the retail manufacturing controller 121. Before manufacturing can take place, however, the cash transaction must be completed either through credit card, check or cash. To prevent fraud or to prevent needless wasteful manufacturing, the transaction is first completed and then the movie is manufactured for rental or sell-through.

The manufacturing of the movie begins by transmitting a request-to-manufacture to the host data center 10 where the host manufacturing controller 107 sends a query to the accounting and transaction engine 109 to determine if the studio has granted authorization to manufacture this particular video. For example, this video may be a new release that may already be in storage but has not been released to the public at this point in time. If the movie is available for rental or sell-through, the host manufacturing controller 107 will issue an authorization to manufacture the movie which goes back to the retail manufacturing controller 121 through the ATM network and switches 113, 127, 125.

After authorization, the retail manufacturing controller 121 will determine wether the movie is on local cache storage or if it must be downloaded from the host data center 10. If the movie already exists on local storage, the retail manufacturing controller 121 will then cause the manufacturing server 117 to begin the manufacturing process. The remote manufacturing controller 121 will cause the cassette robotics cabinet to either locate the movie if it has already been recorded and available or it will load a blank cassette into one of the many highspeed VHS writers which is not busy at the time. Once the high speed writer is loaded with a tape and positions the tape to begin recording, the retail manufacturing controller 121 causes the manufacturing server 117 to begin recording the tape at forty times its normal speed. When the manufacturing is complete, the high speed recording device will send an acknowledgment back to the manufacturing server 117 indicating that the recording was completed successfully. This acknowledgment is then forwarded to the retail manufacturing controller 121 that the manufacturing is completed successfully.

Simultaneous with the cassette manufacture, the retail manufacturing controller 121 may print any cassette artwork that is needed and can be placed on the shell of the cassette or on the packaging. This packaging is printed with a color artwork printer 119 and hand assembled by the operator at the point of sale. Once the movie is placed in the artwork shell, the tape is handed to the customer and the transaction is complete. A receipt of the transaction is printed on receipt printer 131.

The retail manufacturing controller 121 sends a message to the host manufacturing controller 107 that this transaction has taken place. The financial transaction cycle is not complete however since the issuance of the tape to the customer is only one half of the financial transaction cycle. Several days later the customer will return the movie to the store where it is inserted back into the robotic cabinet and the high speed VHS recording device reviews the header or trailer information off the tape to insure that the correct tape was returned by the customer. Once verified, the customer information database is updated that the tape was returned correctly or that the tape was returned late or the wrong tape was returned. As the tape is rewound, the tape can be refurbished by the high speed writer and once rewound loaded back into the robotic storage cabinet. After the tape is properly verified and returned to the robotic cabinet, the retail manufacturing controller 121 will send a network message back to the host manufacturing controller 107 indicating that the customer returned the tape on time or late which completes the full financial transaction.

In the preferred embodiment of the present invention, the customer of rental tapes may be encouraged not to rewind the tape so that the refurbishing of the tape may be done at the retail outlet during the rewind process. The tape header or trailer information may be read during the refurbishing process to further reduce the amount of time needed for check-in.

System Transaction Flow

Figure 18:
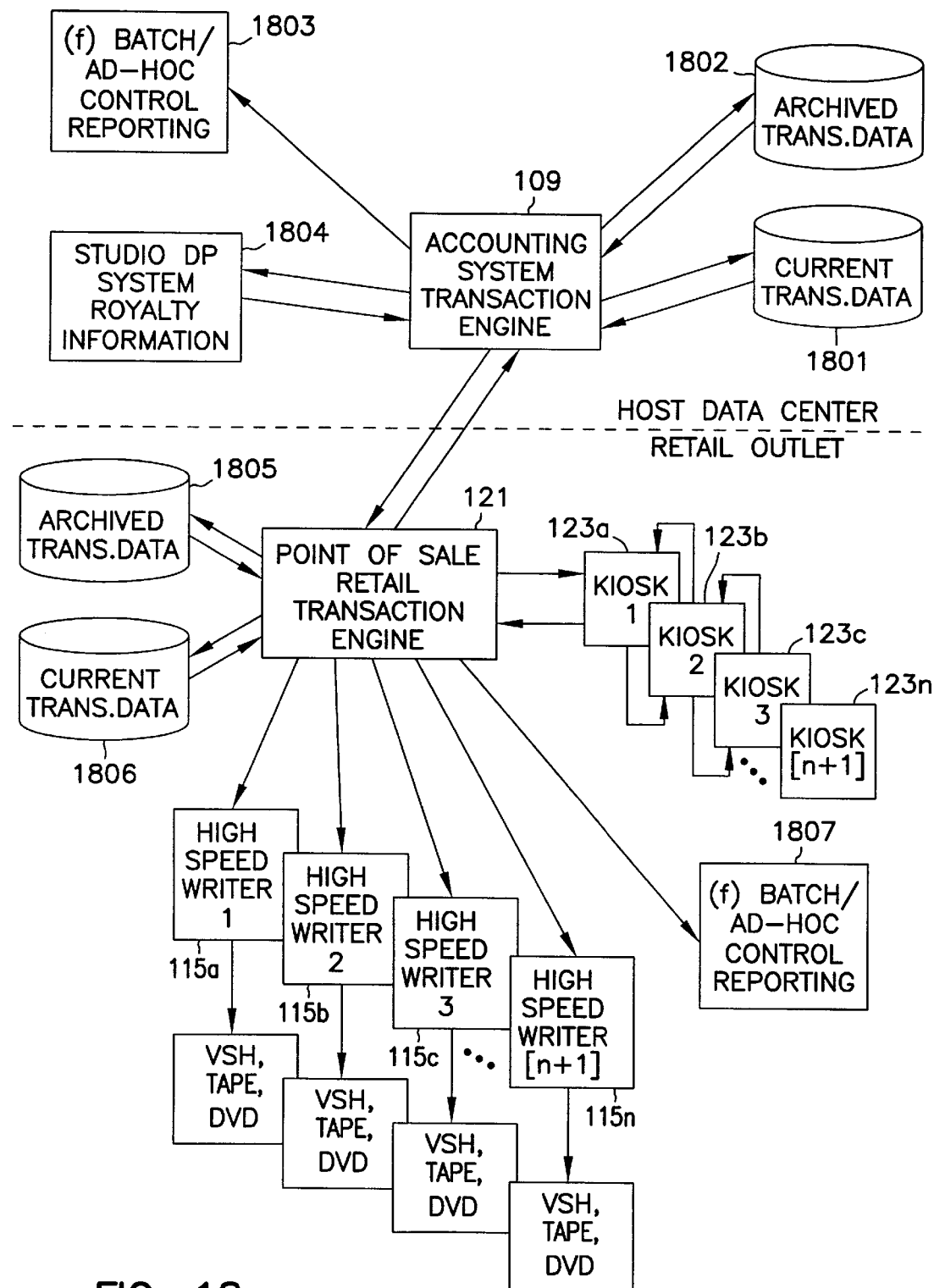
FIG. 18 is a diagram of the financial transaction flow for the purchase or rental of a movie.

FIG. 18 is a diagram of a financial transaction flow of the present invention for the purchase or rental of a movie and Table 3 is listing of the transaction types used with the present invention. A customer transaction begins at the kiosk 123 with the customer ordering a movie to purchase or rent by pressing the generate or manufacture key. At this point, payment verification is initiated with a cash or credit card deposit within the retail outlet cash register. When the cash is received, cash voucher transaction data will be appended to a transaction packet termed "Transaction 01". The Transaction 01 information is sent from the point-of-sale retail transaction engine 121 to the accounting system transaction engine 109 at the host data center 10. If the customer is paying by credit card, the accounting transaction engine 109 initiates a credit verification transaction to the customer's banking system. In this case, an external interface is utilized (not shown) which verifies credit card transactions by modem as is known to those skilled in the art.

After the Transaction 01 has been received and verified by the accounting system transaction engine 109, the request to manufacture a tape is granted and a "Transaction 02" type packet (authorization to manufacture a tape) will be generated by the accounting system transaction 109. As described above in the case of a rental, this entire financial transaction will not be closed or completed until the movie cassette is returned to the inventory at the retail outlet 20. Receipt of the returned movie tape will generate a system transaction 08 which will close the entire transaction cycle. Once a transaction is closed due to the return of the tape, the information contained in the current transaction database 1808 is transferred to the archived transaction database 1802.

Other types of transactions may take place within the system shown in FIG. 18. For example, a system "Transaction 05" will allow adding and changing information within the customer database and may be executed from the kiosk 123. Any deletion activities within the customer database requires a specific customer request. All of the aforementioned transactions are executed as a normal online activity between the point-of-sale retail transaction engine 121 and the accounting system transaction engine 109.

Other types of transactions take place within the system as secondary priority items which are run offline so that the information flow between the accounting system transaction engine 109 and the point-of-sale retail transaction engine 121 are not burdened with these types of maintenance transactions. Thus, these secondary system transactions are run in a batch mode. Examples of secondary system transactions are Transaction 07 for evaluating and calibrating the hardware platforms and software systems in execution at the host data center and retail outlet and including the kiosks 123. This transaction type measures all events occurring within the system and the connecting networks by measuring traffic, data flow, down time, etc. to assist in maintenance of the system.

A system "Transaction 10" is used for the transmission of studio royalty payment information 1804 to the copyright holders of the respective movies manufactured at the retail outlet. This information can be updated on a daily basis, or more often if necessary, to provide the studio with detailed information of royalty dollars, transaction information and demographic information about the rentals.

Other types of batch and control reporting 1803 are generated by the accounting system transaction engine 109 using secondary transactions 03, 04 and 06 to generate reports on the activity within the system.

TABLE 3

System Transaction Types

| Transaction Number | Transaction Description |
|---|---|
| 01 | Request to manufacture a tape for purchase or rental |
| 02 | Authorization to manufacture a tape |
| 03 | Studio database maintenance such as add, change or delete |
| 04 | Movie database maintenance for adding, deleting or changing a trailer, preview, artwork or labels |
| 05 | Customer database maintenance for adding, changing or deleting |
| 06 | General ledger maintenance for adding, changing or deleting |
| 07 | Hardware/software diagnostics |
| 08 | End of transaction life cycle for a tape |
| 10 | Studio royalty payment information |

Redundancy is built into the system by ensuring that the archive transaction data 1802 and the current transaction data 1801 of the host data center 10 is duplicated at the retail outlet in the archive transaction database 1805 and the current transaction database 1806.

Movie Data Flow

Figure 19:
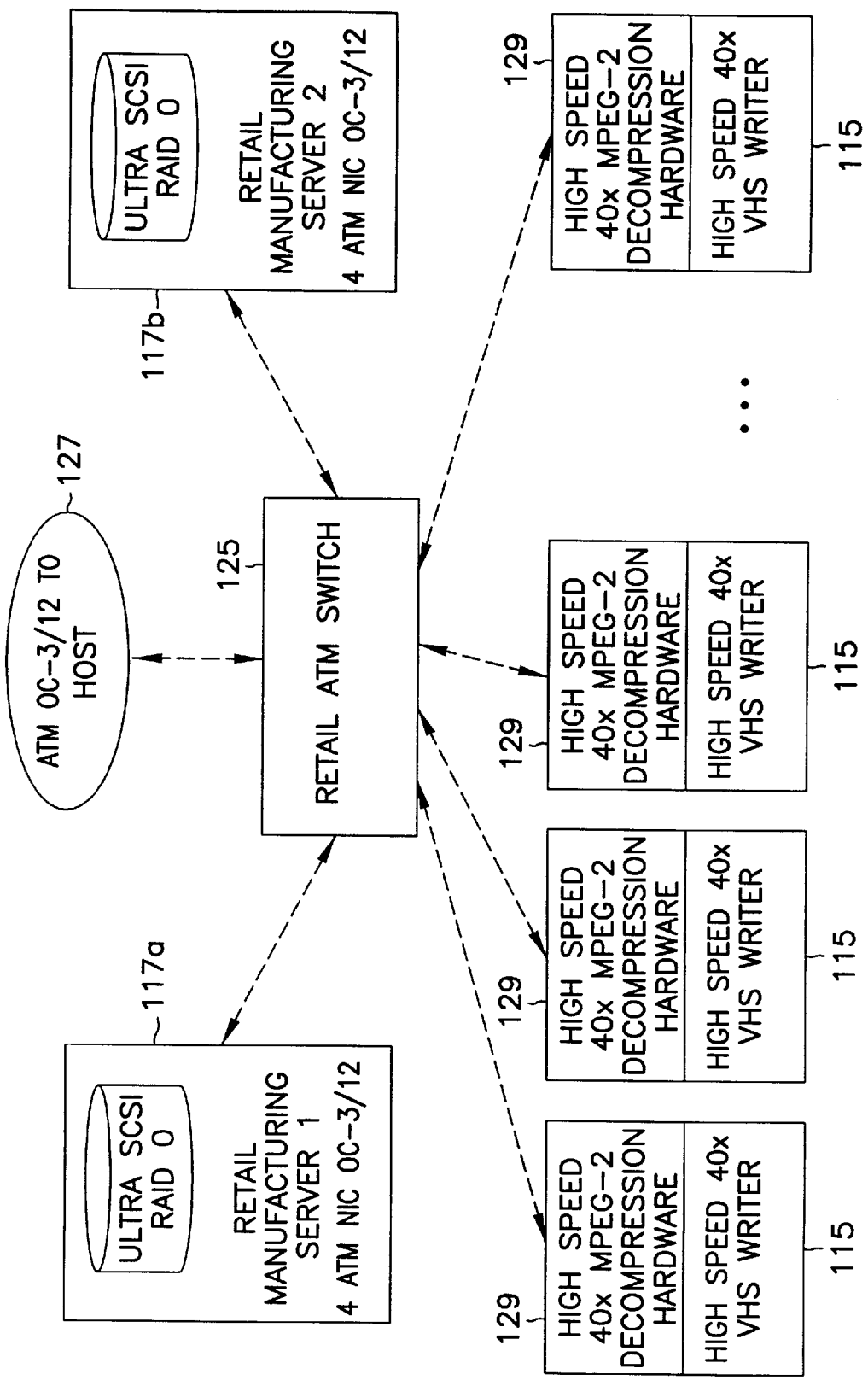
FIG. 19 is a diagram of the digital movie data flow at the retail manufacturing site.

The movie data flow throughout the system is shown in FIG. 19. In the preferred embodiment of the present invention, it is estimated that at least 80% of the movies requested locally at the retail outlet 20 will be held locally in the cache disk storage of the retail manufacturing servers 117. As shown in FIG. 19, multiple retail manufacturing servers 117A, 117B, etc. may be located at a retail manufacturing outlet 20 to service a higher volume of movie manufacturing. It is envisioned that the movies held locally will be held on rotating mass storage using the RAID 0 standard with a fast ultraSCSI interface to the manufacturing server 117. When held locally, the movie is downloaded through the retail ATM switch 125 to one of a plurality of high-speed decompression engines 129 connected to a high-speed 40× VHS writer 115. The connection between the retail manufacturing server 117 and the high-speed decompression engine 129 would be through fiber optic OC-3 or OC-12 connections. In an alternate embodiment, Ultra SCSI connections direct from the retail manufacturing server 117 to the high-speed decompression hardware 129 could be used instead of the ATM network.

By holding most of the requested movies locally, the amount of traffic over the ATM SONET connection 127 to the host data center 10 is reduced. The single retail manufacturing server is capable of providing movie data files to up to four high-speed writers simultaneously with unique movie files. Thus, the configuration of FIG. 19 lends itself very well to the mass duplication market in which a single release is to be manufactured by a plurality of videotape writing machines. Thus, the configuration of FIG. 19 is well suited for the mass duplication market.

Figure 20:
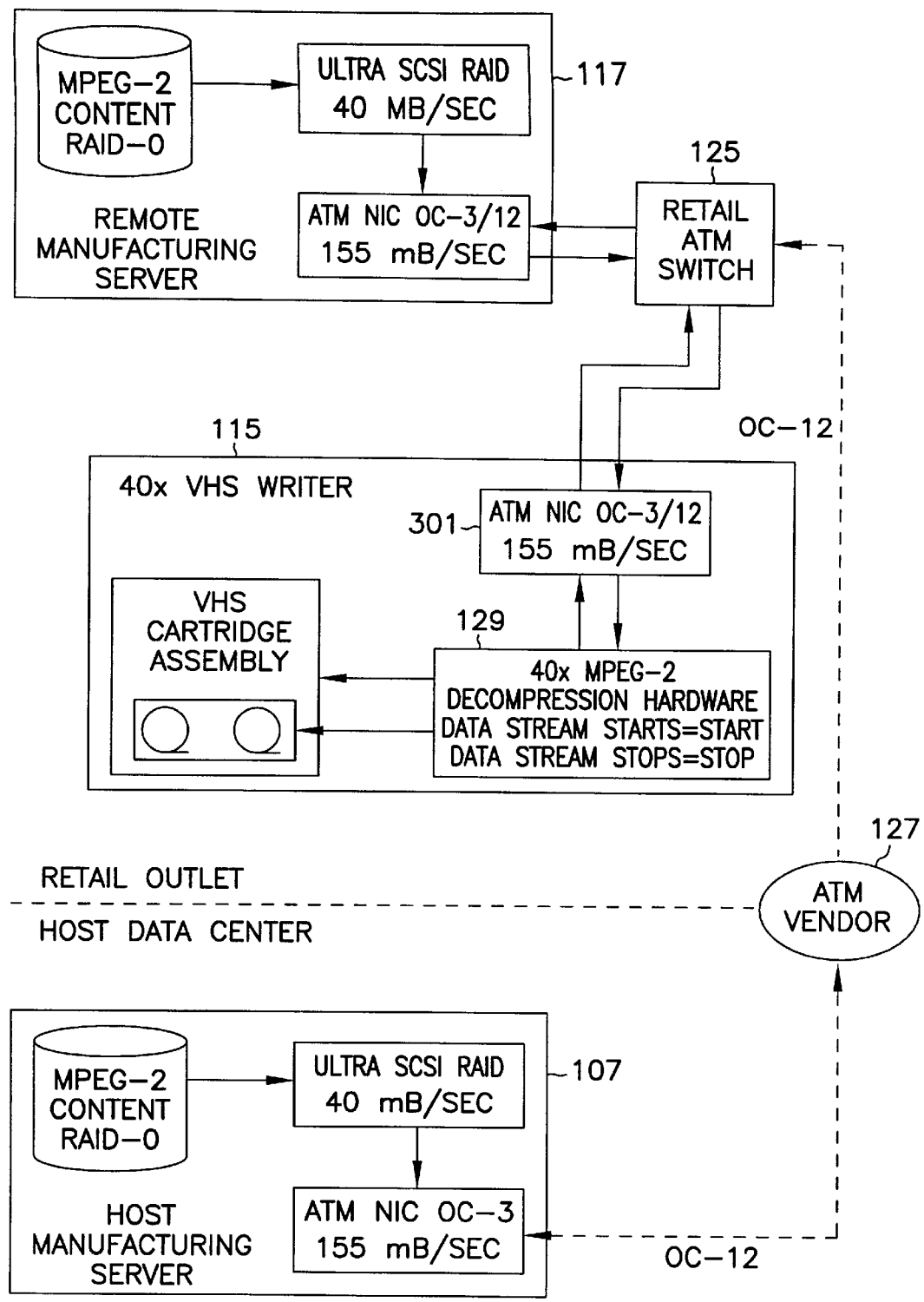
FIG. 20 is a more detailed diagram of the digital movie data flow and conversion.

FIG. 20 shows the manufacturing server operation and the movie data flow when the movie is not held locally in local cache storage. Referring to FIGS. 19 and 20, the VHS cassette duplication will start when the remote manufacturing server 117 receives a request packet indicating that a "start duplication" command is received. Included in the request packet will be the content serial number (movie file name) and destination ATM address of the physical high-speed writer. The remote manufacturing server application will begin the transfer of the information of the MPEG-2 file containing the digital information for the movie to be manufactured from the MPEG-2 content SCSI RAID-0 disk drive to the ATM NIC OC-3/12 card via the Ultra SCSI RAID interface. The movie is then delivered to the retail outlet 20 via the SONET ATM vendor 127 via OC-12 fiber optic connections.

The movie is received at the retail outlet 20, at the retail ATM switch 125 where it is transferred via the ATM NIC OC-3/12 card 117 where it is stored in the MPEG-2 content disk array in a striped RAID-0 format via the Ultra SCSI RAID interface. Once the movie is downloaded from the host manufacturing server 107 to the remote manufacturing server 117, manufacture of the movie is performed as though the movie were always held locally in cache disk storage.

In an alternate embodiment, the movie can be manufactured directly from the host manufacturing server 107 without the intervention of the remote manufacturing server 117. In this embodiment, the MPEG-2 movie file is received from the host data center through the retail ATM switch 125 at the retail outlet 20 where it is immediately transferred to the high-speed VHS writer 115. The data file is received by ATM NIC OC-3/12 card 301 where the MPEG-2 file is immediately decompressed in a parallel format by decompression engine 129 for writing onto the VHS cartridge and tape assembly.

Redundancy of communication connections within the system is necessary to prevent the entire system from going down should the host data center be unavailable for any reason. For example, if the ATM SONET connection 127 between the host data center 10 and the retail outlets 20 is unavailable for any reason, alternate means of transferring transaction information and data are available such as land-based telephone lines. Land-based telephone lines may be too slow to transfer the four gigabyte MPEG-2 movie files, however, since a large number of the movies to be manufactured are located at local cache storage, the retail outlets are still able to function as long as the financial information can be transferred between the accounting and transaction engine 109 of the host data center 10 and the retail outlet manufacturing controller 121 of the retail outlet 20. This is accomplished by having alternate RS-232 or dial-up telephone connections as shown in FIG. 1.

In another alternate embodiment, the local retail outlet 20 can be authorized to manufacture a certain number of movies locally if the communication channels between the retail outlet 20 and the host data center are down. Since 80% of the movies are still available in local cache memory, the retail outlet could manufacture up to a limited number of movies without having direct electronic connection between the retail outlet manufacturing controller 121 and the accounting and transaction engine 109. This, of course, would be limited by constraints such as fraud prevention and copyright royalty avoidance problems. Once the retail outlet is back on line, the transactions could be batched and sent to the accounting and transaction engine 109 from the retail outlet manufacturing controller 121 to bring the two systems back into synchronization. Thus, once the communication is re-established, the archive transaction database files 1802 and the current transaction database files 1801 of the host data center 10 are synchronized with the archive transaction database files 1805 and the current transaction database files 1806 of the retail outlet 20 as shown in FIG. 18.

Video on Demand

Figure 21:
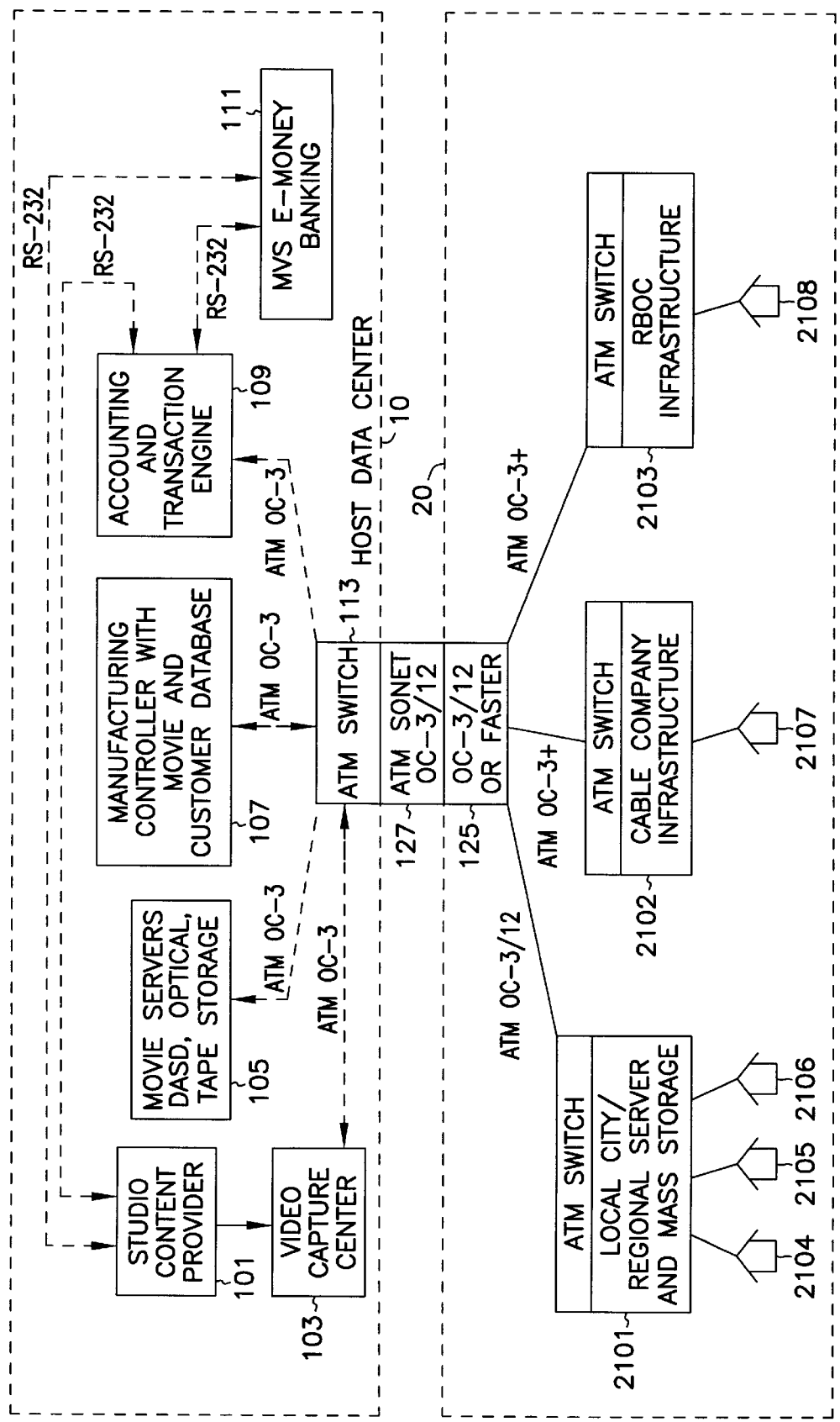
FIG. 21 is a diagram showing direct video on demand delivery.

The present invention is readily adaptable to a video-on-demand architecture as shown in FIG. 21. The host manufacturing center is as described in FIG. 1 but in addition to the retail outlets 20 of FIG. 1, separate ATM switches and local or regional service centers could be established for providing real-time video-on-demand feeds to homes, businesses, offices, libraries and the like. For example, a local or regional service center 2101 contains the equivalent of a retail outlet manufacturing controller 121 to interface with the manufacturing controller 107 of the host data center 10. Movies requested from a home 2104, a business 2105 or a school library 2106 could be downloaded to local cache memory within the server 2101 and delivered to, for example, the home 2104 via an ATM fiber optic connection, standard cable or twisted pair wires, depending on the necessary bandwidth needed for real-time viewing of video. The same connections could be made between the service center 2101 and the business 2105 or the school library 2106.

In an alternate embodiment, a cable head end could provide video on demand to subscribers 2107 by having the equivalent of the retail outlet manufacturing controller 121 and the VHS manufacturing server 117 within the cable company infrastructure 2102 as also shown in FIG. 21. Movies are delivered to the cable head end 2102 from the manufacturing controller 107 for realtime playing over a dedicated channel at the subscriber's location 2107, being delivered by fiber optic cable or standard CATV cable.

In yet another alternate embodiment, a regional bell operating company such as a local telephone company could also have the equivalent of a retail outlet infrastructure 20 within the RBOC (regional bell operating company) infrastructure 2103 for the delivery of video on demand to the subscriber location 2108, also shown in FIG. 21. Once again, the RBOC infrastructure 2103 operates similarly to the retail outlet 20 in completing transaction orders and delivery of video on demand to the subscriber 2108.

Manufacturing Server Operation

Referring to FIG. 20, the VHS cassette duplication will start when the remote manufacturing server 117 receives a request packet indicating that a "start duplication" command is received. Included in the request packet will be the content serial number (file name) and destination ATM address of the physical high-speed writer. The remote manufacturing server application will begin the transfer of the information of the MPEG-2 file containing the digital information for the movie to be manufactured from the MPEG-2 content SCSI RAID-0 disk drive to the ATM NIC OC-3 card via the Ultra SCSI RAID interface.

CONCLUSION

Although specific embodiments have been illustrated and described herein, it will be appreciated by those of ordinary skill in the art that any arrangement which is calculated to achieve the same purpose may be substituted for the specific embodiments shown. This patent is intended to cover any adaptations or variations of the present invention. Therefore, it is manifestly intended that this invention be limited only by the claims and the equivalents thereof.

What is claimed is:

1. A video distribution and manufacturing system, comprising:

a movie capture facility for capturing a movie content having a corresponding title and for producing therefrom digital data representing the movie content in the form of a movie data file;

a movie storage facility coupled to receive and store the movie data file;

a central host server coupled to the movie storage facility for catalogig a movie data file with the corresponding title and for retrieving the movie data file from the movie storage facility upon receipt of a transfer request;

a communications network coupled to the central host server for receiving the movie data file and for transmitting the movie data file over the communications network;

a remote server coupled to the communications network for receiving the movie data file;

a selection device coupled to the remote server for selecting the movie content for manufacture; and a production device coupled to the remote server and the selection device for reproducing the movie content from the movie data file;

a decoding apparatus connected between the remote server and the production device and operable for receiving the movie data file, for parallel decompressing the movie data file and for producing therefrom a plurality of parallel bit streams of the digital data representing the movie content; and the production device further operable for manufacturing the movie content from the parallel bit streams received from the decoding apparatus.

2. The video distribution and manufacturing system according to claim 1 wherein the production device is a video tape writing apparatus and the movie content is written onto a video tape.

3. The video distribution and manufacturing system according to claim 1 wherein the production device is a digital video disk writing apparatus and the movie content is written onto a digital video disk.

4. The video distribution and manufacturing system according to claim 1 further including a second movie storage facility connected to the remote server for storing the movie data file for later manufacture.

5. The video distribution and manufacturing system according to claim 1 wherein the production device is a video tape writing machine which includes a single helical scan write drum having a separate write head for each of the parallel bit streams.

6. The video distribution and manufacturing system according to claim 5 wherein the production device is an analog video tape writing machine and wherein the parallel bit streams of the digital data are converted to parallel analog signals for each write head of the helical scan write drum.

7. The video distribution and manufacturing system according to claim 1 further including a financial transaction engine connected to the central host server and operable for communicating over the communications network to the remote server to transmit and receive transaction information for the movie data file.

8. The video distribution and manufacturing system according to claim 7 wherein the financial transaction engine receives the transfer request from the remote server, sends an authorization to transfer the movie data file to the central host server, and receives payment information from the remote server.

9. The video distribution and manufacturing system according to claim 1 wherein the selection device includes a viewing station to select a prerecorded video content.

10. The video distribution and manufacturing system according to claim 9 wherein the selection device includes a user interface for selecting and paying for the purchase or rental of a selected prerecorded video content.

11. The video distribution and manufacturing system according to claim 8 wherein the financial transaction engine maintains a transaction file for each rental or purchase made at the remote site and closes the transaction only upon return of a rented medium or upon receipt of the funds for a purchased medium.

12. The video distribution and manufacturing system according to claim 11 wherein the financial transaction engine electronically communicates with at least one financial institution to receive payments for the rental or purchase of the medium.

13. The video distribution and manufacturing system according to claim 11 wherein the financial transaction engine electronically communicates with at least one financial institution to make royalty payments for the rental or purchase of at least one of the medium.

14. The video distribution and manufacturing system according to claim 1 wherein the central host server and the remote server are in different physical locations and at least one portion of the communications network includes a fiber optic connection.

15. A method of distributing movie content information, comprising the steps of:
 storing a movie content into a movie data file at a first location;
 receiving a request to transfer a copy of the movie data file;
 sending the movie data file from a first location to a second location;
 storing the movie data file at the second location;
 decompressing the movie data file to produce an uncompressed data stream to produce a plurality of parallel uncompressed data streams; and
 writing the movie content onto a medium in parallel from the parallel uncompressed data streams.

16. The method according to claim 15 wherein the step of reproducing the movie content further includes the step of writing the movie content onto a video tape.

17. The method according to claim 16 wherein the step of writing the movie content onto a video tape in parallel from the parallel uncompressed data streams further includes the step of converting the parallel uncompressed data streams to parallel uncompressed analog signals and writing the movie content onto a video tape in parallel from the parallel uncompressed analog signals.

18. A prerecorded video distribution system, comprising:
 a prerecorded video storage facility having mass storage for storing a prerecorded video digital data file representing prerecorded audio and video content;
 a host server coupled to the prerecorded video storage facility for cataloging the prerecorded video data file with a corresponding identifier and for retrieving the prerecorded video data file from the prerecorded video storage facility upon receipt of a transfer request;
 a communications network coupled to the host server for receiving the prerecorded video data file and for transmitting the prerecorded video data file over the communications network;
 a decompression engine connected for receiving the prerecorded video data file, for parallel decompressing the prerecorded video data file and for producing therefrom a plurality of parallel bit streams of the digital data representing the prerecorded audio and video content; and
 a production device operable for manufacturing the prerecorded audio and video content from the parallel bit streams received from the decompression engine.

19. The prerecorded video duplication system according to claim 18 wherein the production device is a video tape writing apparatus and the prerecorded audio and video content is written onto a video tape.

20. The prerecorded video duplication system according to claim 19 wherein the prerecorded audio and video content is written as an analog signal onto the video tape.

21. The prerecorded video duplication system according to claim 20 wherein the prerecorded audio and video content is written as a digital signal onto the video tape.

22. The prerecorded video duplication system according to claim 18 wherein the prerecorded audio and video content is written in MPEG-2 digital format onto the video tape.

23. The prerecorded video duplication system according to claim 18 wherein the decompression engine decodes parallel over space compression.

24. The prerecorded video duplication system according to claim 18 wherein the decompression engine decodes parallel over time compression.

25. The prerecorded video duplication system according to claim 18 wherein the production device is a digital versatile disk writing apparatus and the prerecorded audio and video content is written onto a digital versatile disk.

26. The prerecorded video duplication system according to claim 18 wherein the production device is a plurality of video tape writers and the decompression engine services the plurality of video tape writers operating in parallel.

27. The prerecorded video duplication system according to claim 18 wherein the production device is a video tape writing machine which includes a helical scan write drum having a separate write head corresponding to each of the parallel bit streams.

28. The prerecorded video duplication system according to claim 27 wherein the production device is an analog video tape writing machine and wherein the parallel bit streams of the digital data are converted to parallel analog signals for each write head of the helical scan write drum.

29. A video manufacturing system, comprising:
 a video digital data file representing prerecorded audio and video content;
 a prerecorded video storage facility having the prerecorded video digital data file stored therein;

a host server coupled to the prerecorded video storage facility;

a communications network coupled to the host server for transferring the prerecorded video data file;

a remote server connected to the communications network;

a decompression engine connected to the remote server which parallel decompresses the prerecorded video data file to produce a plurality of parallel bit streams representing the prerecorded audio and video content; and a production device connected to the decompression engine for manufacturing the prerecorded audio and video content from the parallel bit streams received from the decompression engine.

30. The video manufacturing system according to claim 29 further including:

a digital to analog conversion circuit connected between the decompression engine and the production device and operable for receiving the plurality of parallel bit streams and for producing therefrom a plurality of parallel signals of analog information; and each of the plurality of production devices further operable for recording the prerecorded audio and video content onto a medium from the parallel signals of analog information.

31. The video manufacturing system according to claim 30 wherein the plurality of parallel signals of analog information represent chominance, luminance and audio information from the prerecorded audio and video content.

32. The video manufacturing system according to claim 31 wherein the production device writes the prerecorded audio and video content onto video tape in at least 40 times the normal viewing speed.

33. A method of manufacturing video tapes, comprising:

storing a prerecorded video content in a prerecorded video data file;

recording a financial transaction to reproduce the prerecorded video content;

retrieving the prerecorded video data file;

decompressing the prerecorded video data file;

producing a plurality of parallel uncompressed data streams; and writing the prerecorded video content onto video tape in parallel from the parallel uncompressed data streams.

34. The method according to claim 33 further including converting the plurality of parallel uncompressed data streams into a plurality of parallel analog signals.

35. The method according to claim 34 wherein writing the prerecorded video content further includes helical scan writing the plurality of parallel analog signals onto a video tape.

* * * * *